United States Patent [19]
Takashimizu

[11] Patent Number: 5,847,838
[45] Date of Patent: Dec. 8, 1998

[54] DOCUMENT READING CONFIRMATION MECHANISM AND DOCUMENT READING APPARATUS INCLUDING CONFIRMATION MECHANISM

[75] Inventor: Yoshihiro Takashimizu, Kawasaki, Japan

[73] Assignee: Fujitsu Limited, Kawasaki, Japan

[21] Appl. No.: 519,154

[22] Filed: Aug. 21, 1995

[30]     Foreign Application Priority Data

Dec. 15, 1994  [JP]  Japan ..................................... 6-311884

[51] Int. Cl.$^6$ ................................. H04N 1/00; H04N 1/04
[52] U.S. Cl. .......................... 358/401; 358/496; 358/296
[58] Field of Search ................................... 358/400, 401, 358/474, 496, 498, 296, 488, 494; 101/103, 327, 368

[56]           References Cited

U.S. PATENT DOCUMENTS

| | | | |
|---|---|---|---|
| 4,470,693 | 9/1984 | Dolan ....................................... | 358/300 |
| 4,901,158 | 2/1990 | Sato et al. ................................. | 358/296 |
| 4,908,714 | 3/1990 | Iriyama et al. ........................... | 358/496 |
| 5,497,250 | 3/1996 | Kawashima ............................... | 358/498 |
| 5,532,847 | 7/1996 | Maruyama ................................. | 358/498 |
| 5,535,022 | 7/1996 | Itoigawa .................................... | 358/496 |

FOREIGN PATENT DOCUMENTS 63-250959  10/1988  Japan .
1-205658   8/1989   Japan .

*Primary Examiner*—Thomas D. Lee
*Attorney, Agent, or Firm*—Armstrong, Westerman, Hattori, McLeland, & Naughton

[57]            ABSTRACT

A document reading apparatus used in a printer or a facsimile. The apparatus includes a document reading confirmation mechanism for printing a character or mark on a document to allow confirmation of whether the document has been read by the document reading apparatus or not. The confirmation mechanism includes a movable guide plate and an auxiliary guide slidably engaged with and cooperating with the movable guide plate to provide together a guide surface for the entire surface of the document at all times when the movable guide plate is placed at any position. A printing head is mounted to the movable guide plate to record a document reading confirmation mark on the document while it is conveyed.

21 Claims, 21 Drawing Sheets

DOCUMENT READING CONFIRMATION MECHANISM AND DOCUMENT READING APPARATUS INCLUDING CONFIRMATION MECHANISM

BACKGROUND OF THE INVENTION

1. Field of the Invention

The present invention relates to a document reading apparatus such as an image scanner or a facsimile, and in particular, it relates to a document reading confirmation mechanism arranged in a document reading apparatus, for recording a document reading confirmation mark on a document passing through a reading unit to allow confirmation whether the document has been read, or not, by a document reading apparatus.

2. Description of the Related Art

A document reading apparatus has a document feeding portion, a document reading portion and a document discharging portion arranged along a document conveying passage. Documents such as printed papers are sequentially delivered from the document feeding portion to the document reading portion one by one, and data recorded on the document are optically read and then sequentially processed by an electronic processing means including a microcomputer. The documents are then delivered from the document reading portion to the document discharging portion.

In recent years, document reading apparatuses of this kind have been developed. Recent document reading apparatuses have a large reading capacity at high speed and are capable of handling documents of a variety of sizes. In the case of a high-speed large-capacity document reading apparatus, double feeding (two documents laid one above another) often occurs. If a double feed occurs, a stack of documents is delivered to the document reading portion, with the result that one of the documents is not read and the data thereof cannot be used. Therefore, when a loss of data due to a double feeding is not permitted, an operator must feed the documents one by one by hand to the document reading portion, even though the machine is a high-speed document reading apparatus, and the efficiency of the operation falls.

In a facsimile, so far, a suitable mark has been recorded, by a document reading confirmation mechanism, on a document which passes through the document reading portion. That is, a suitable mark is recorded on an appropriate area, i.e., an marginal region of the document after it has passed through the document reading portion, so that one can confirm whether the document has been read, or not, by observing the mark. In the conventional document reading confirmation mechanism, however, the mark is put on at a predetermined the position and it is not possible to change the position of mark. In a document reading apparatus capable of reading documents of a variety of sizes as described above, i.e., capable of reading data from slips and vouchers of a variety of sizes, there is a desire that a user can change a position of the mark, depending upon the kind of slips and vouchers. However, the conventional document reading confirmation mechanisms cannot satisfy such a requirement.

Further, the document reading confirmation mark is usually recorded with a liquid coloring material such as an ink. In this case, part of the constituent elements of the document reading confirmation mechanism and part of the constituent elements of the document reading apparatus are often contaminated by the document reading confirmation mark on the document, and such a contamination may spread to the subsequent documents. It is therefore desired to prevent the documents from being contaminated as much as possible.

Further, a document reading apparatus by which data on both surfaces of one document can be simultaneously read has been recently developed. In this case too, it can be confirmed whether the data on both surfaces of the document are read or not, by recording a document reading confirmation mark on only one surface of the document. However, this is a relatively cumbersome confirmation operation because, when there is data on both surfaces of the a document and there is a double-fed, it becomes impossible to read the data recorded on the lower surface of the document which is placed above the other document on which no document reading confirmation mark is recorded. In effect, in the case where the data are recorded on both surfaces of the documents and when the document reading confirmation mark is recorded on one surface thereof only, it is not possible to confirm whether each document is read or not from the document reading confirmation mark, and therefore, the removal of this defect has been desired.

In the conventional high-speed document reading apparatus, when a document is jammed in the document conveyer passage, it is possible to easily obtain access to the document conveyer passage to remove the documents. That is, in such a high-speed document reading apparatus, the housing of the apparatus comprises a main frame and a subframe pivotably attached to the main frame so that the subframe can be opened and closed, and the document conveying passage is formed along the boundary surface between the main frame and the subframe so that the document conveyer passage is exposed when the subframe is opened and the jammed documents can be quickly dealt with. The document reading confirmation mechanism must be arranged, at a position in the document conveyer passage, in such a manner that the above-mentioned feature does not impair the document read mechanism. In the document reading confirmation mechanism, for example, attention should be given such that jamming of document should not occur and, if it does occur, the jammed document can be quickly dealt with.

To reduce the cost of the basic high-speed document reading apparatus, it is recommended that the document reading confirmation mechanism is an optionally available unit and can be easily assembled into a high-speed document reading apparatus after it is manufactured or after it is sold. In this case, if the document reading confirmation mechanism is an optional unit, there is no need to manufacture two kinds of high-speed document reading apparatuses, i.e., a high-speed document reading apparatus with the document reading confirmation mechanism and a high-speed document reading apparatus without the document reading confirmation mechanism. If the document reading confirmation mechanism is built in the document reading apparatus, a user who does not need the document reading confirmation mechanism will have to pay extra.

SUMMARY OF THE INVENTION

The object of the present invention is to provide a document reading confirmation mechanism arranged in a document reading apparatus for recording a document reading confirmation mark on a document to allow confirmation of whether the document is read by the document reading apparatus, or not, in which it is possible to change the position of the document reading confirmation mark with respect to the document.

Another object of the present invention is to provide a document reading confirmation mechanism, in which there is means for preventing documents from being contaminated with document reading confirmation mark ink, when the document reading confirmation mark is recorded with a liquid coloring material such as an ink.

A further object of the present invention is to provide a document reading confirmation mechanism which is so constructed that jamming of document should not occur and if it does occur, jammed documents can be quickly dealt with.

A still further object of the present invention is to provide a document reading confirmation mechanism arranged in a document reading apparatus in which data recorded on both surfaces of a document can be simultaneously read, the document reading confirmation mechanism being constructed so that document reading confirmation marks can be recorded on both surfaces of the document.

A yet further object of the present invention is to provide a document reading apparatus incorporating a document reading confirmation mechanism of the above-mentioned type.

A further object of the present invention is to provide a document reading apparatus which, as required, is capable of easily and quickly having the document reading confirmation mechanism incorporated therein.

According to the first aspect of the present invention, there is provided a document reading confirmation mechanism arranged in a document reading apparatus for recording a document reading confirmation mark on a document to allow confirmation of whether the document has been read by the document reading apparatus or not. The document reading confirmation mechanism comprises a guide means providing a guide surface for a document conveyed in a predetermined conveying direction, the guide means including a movable guide plate being movable in the transverse direction with respect to the conveying direction within a predetermined range, and recording means mounted to the movable guide plate of the guide means for recording a document reading confirmation mark on the document while the document is conveyed along the guide surface of the guide means.

Preferably, the guide means includes at least one auxiliary guide arranged on at least one portion of he movable guide plate for slidable engagement with the movable guide plate, the movement of the at least one auxiliary guide being regulated so that the at least one auxiliary guide cooperates with the movable guide plate to provide a guide surface for the entire surface of the document at all times when the movable guide plate is placed at any position within the predetermined range.

Preferably, the guide means includes a support frame for movably holding the movable guide plate, the support frame includes a guide rod for guiding the movable guide plate, and a manually operable locking means is provided between the movable guide plate and the guide rod for releasably locking the movable guide plate to the guide rod. Alternatively, the guide means includes a support frame for movably supporting the movable guide plate, the support frame includes a guide screw for rotatably guiding the movable guide plate, and the movable guide plate has a nut for engagement with the guide screw.

In the document reading confirmation mechanism according to the first aspect of the present invention, the moving guide plate for mounting the recording means can move in the transverse direction within the predetermined range relative to the document conveying direction. Therefore, it is possible to change the position of the document reading confirmation mark recorded on the document, as required.

When auxiliary guides are provided, the auxiliary guides cooperate with the moving guide plate to provide a guide surface for the entire surface of the document at all times when the guide plate is at any position. Accordingly, the document can be stably conveyed through the document reading confirmation mechanism.

According to the second aspect of the present invention, there is provided a document reading confirmation mechanism arranged in a document reading apparatus for recording a document reading confirmation mark on a document to allow confirmation whether the document has been read by the document reading apparatus or not. The document reading confirmation mechanism comprises a first guide means providing a guide surface for a document conveyed in a predetermined conveying direction, the first guide means including a movable guide plate being movable in the transverse direction with respect to the conveying direction within a predetermined range, a second guide means providing a guide surface in an opposite relationship with the guide surface of the first guide means to cooperate with the guide surface of the first guide means for forming a guide passage between the guide surfaces, and recording means mounted to the movable guide plate of the first guide means for recording a document reading confirmation mark on the document while the document is conveyed along the guide passage.

Preferably, the second guide means is movable between a closed position at which the guide passage is formed and an open position at which the guide passage is opened.

Preferably, the recording means comprises an ink jet type printing head, and the second guide means includes an ink absorbing material for receiving and absorbing ink droplets ejected from the printing head.

Preferably, the second guide means includes a holding plate for holding the ink absorbing material, and the holding plate is detachably held in the second guide means.

Preferably, the recording means comprises a marking element with an ink impregnated therein and a drive means for driving the marking element between a recording position and a retracted position, and the marking element is brought into contact with the guide surface of the second guide means at the recording position.

Preferably, the second guide means has a platen, and the marking element is brought into contact with the platen at the recording position.

Preferably, the first guide means includes at least one auxiliary guide arranged on at least one portion of the movable guide plate of the first guide means for slidable engagement with the movable guide plate, the movement of the at least one auxiliary guide being regulated so that the at least one auxiliary guide cooperates with the movable guide plate to provide a guide surface for the entire surface of the document at all times when the movable guide plate is placed at any position within the predetermined range.

Preferably, the first guide means includes a support frame for movably holding the movable guide plate, the support frame includes a guide rod for guiding the movable guide plate, and a manually operable locking means is provided between the movable guide plate and the guide rod for releasably locking the movable guide plate to the guide rod.

Preferably, the first guide means includes a support frame for movably supporting the movable guide plate, the support frame includes a guide screw for rotatably guiding the movable guide plate, and the movable guide plate has a nut for engagement with the guide screw.

In the document reading confirmation mechanism according to the second aspect of the present invention, the moving guide plate holding the recording means can move in the transverse direction within the predetermined range relative to the document conveying direction. Therefore, it is possible to change the position of the document reading confirmation mark recorded on the document, as required. The second guide means has a guide surface that is opposed to the guide surface of the first guide means, and can move between a closed position at which the guide passage is formed and an open position at which the guide passage is opened. When jamming of documents occurs in the document reading confirmation mechanism, the second guide is opened so as to easily and quickly remove the jammed documents.

When the recording means is an ink jet type printer head, the second guide means includes an ink absorbing material for receiving and absorbing ink droplets injected from the printer head, to make it possible to prevent the contamination of the documents with ink droplets. When the auxiliary guides are slidably provided at both ends of the moving guide plate of the first guide means, the auxiliary guides cooperate with the moving guide plate to provide a guide surface for the entire surface of the document at all times when the moving guide plate is at any position. Therefore, the document is stably conveyed through the document reading confirmation mechanism.

According to a third aspect of the present invention, there is provided a document reading confirmation mechanism arranged in a document reading apparatus for recording a document reading confirmation mark on a document to allow confirmation whether the document has been read by the document reading apparatus or not. The document reading confirmation mechanism comprises a first guide means providing a guide surface for a document conveyed in a predetermined conveying direction, the first guide means including a movable guide plate being movable in the transverse direction with respect to the conveying direction within a predetermined range, a second guide means providing a guide surface in an opposite relationship with the guide surface of the first guide means to cooperate with the guide surface of the first guide means for forming a guide passage between the guide surfaces, the second guide means including a movable guide plate being movable in the transverse direction with respect to the conveying direction within a predetermined range, first recording means mounted to the movable guide plate of the first guide means for recording a document reading confirmation mark on one surface of the document while the document is conveyed along the guide passage, second recording means mounted to the movable guide plate of the second guide means for recording a document reading confirmation mark on the other surface of the document while the document is conveyed along the guide passage.

Preferably, the movable guide plates of the first and second guide means are detachably coupled together at one end of each plate thereof for a conjoined movement with each other, and the other end of each movable guide plate is drawably engaged with the auxiliary guides which are arranged at a fixed position.

Preferably, the first guide means includes a support frame for movably holding the movable guide plate, the support frame includes a guide rod for guiding the movable guide plate, and a manually operable locking means is provided between the movable guide plate and the guide rod for releasably locking the movable guide plate to the guide rod.

Preferably, the first guide means includes a support frame for movably supporting the movable guide plate, the support frame includes a guide screw for rotatably guiding the movable guide plate, and the movable guide plate has a nut for engagement with the guide screw.

In the document reading confirmation mechanism according to the third aspect of the present invention, the moving guide plate of the first guide means mounting the first recording means and the moving guide plate of the second guide means holding the second recording means can move in the lateral direction within a predetermined range with respect to the direction in which the document is conveyed. Therefore, not only can the document reading confirmation marks be recorded on both surfaces of the document but also the recording positions can be changed.

According to a fourth aspect of the present invention, there is provided a document reading apparatus comprising a document feeding portion, a document reading portion and a document discharging portion along a document conveying passage, a document conveyer roller arranged between the document reading portion and the document discharging portion to form a part of the document conveying passage, and a document reading confirmation mechanism arranged on the upstream side of the document conveyer roller in a predetermined document conveying direction in the document conveyer passage and close to the document conveyer roller. This document reading confirmation mechanism comprises a guide means providing a guide surface for a document conveyed in the conveying direction, the guide means including a movable guide plate being movable in the transverse direction with respect to the conveying direction within a predetermined range, recording means mounted to the movable guide plate of the guide means for recording a document reading confirmation mark on the document with a liquid coloring material while the document is conveyed along the guide surface of the guide means, and a cleaner applied to the document conveyer roller for cleaning contamination on the document caused by the document reading confirmation mark, the cleaner being supported by the guide means and extending over a range of the movement of the recording means with the movable guide plate.

In the document reading apparatus according to the fourth aspect of the present invention, the cleaner supported by the guide means extends over a range of the movement of the recording means with the moving guide plate. Therefore, contamination of the document conveyer roller caused by the document reading confirmation mark recorded on the document can be cleaned reliably and quickly.

According to a fifth aspect of the present invention, there is provided a document reading apparatus comprising a document feeding portion, a document reading portion and a document discharging portion arranged along a document conveying passage, a document conveyer roller arranged between the document reading portion and the document discharging portion to form a part of the document conveying passage, and a document reading confirmation mechanism arranged on the upstream side of the document conveyer roller in a predetermined document conveying direction in the document conveyer passage and close to the document conveyer roller. This document reading confirmation mechanism comprises a guide means providing a guide surface for a document conveyed in the conveying direction, the guide means including a movable guide plate being movable in the transverse direction with respect to the conveying direction within a predetermined range, recording means mounted to the movable guide plate of the guide means for recording a document reading confirmation mark on the document with a liquid coloring material while the document is conveyed along the guide surface of the guide means, and a cleaner applied to the document conveyer roller for cleaning contamination on the document caused by the document reading confirmation mark, the cleaner being supported by the guide means for conjoint movement with the movable guide plate, the cleaner being arranged in alignment with the recording means mounted to the movable guide plate in the document conveying direction.

In the document reading apparatus according to the fifth aspect of the present invention, the cleaner is supported by the moving guide plate so as to move together with the moving guide plate and arranged in alignment with the recording means mounted on the moving guide plate in the direction in which the document is conveyed. Therefore, contamination of the document conveyer roller caused by the document reading confirmation mark recorded on the document is cleaned reliably and quickly.

According to a sixth aspect of the present invention, there is provided a document reading apparatus comprising a main frame, a subframe pivotably attached to the main frame for pivotal movement between a closed position and an open position with respect to the main frame, the main frame and the subframe having a boundary surface therebetween, a document conveying passage formed along the boundary surface between the main frame and the subframe, a document feeding portion, a document reading portion and a document discharging portion arranged along the document conveying passage, and a document reading confirmation mechanism arranged between the document reading portion and the document discharging portion. The document reading confirmation mechanism comprises a first guide means providing a guide surface for a document conveyed in the document conveying direction, the first guide means including a movable guide plate being movable in the transverse direction with respect to the conveying direction within a predetermined range, a second guide means providing a guide surface in an opposite relationship with the guide surface of the first guide means to cooperate with the guide surface of the first guide means for forming a guide passage between the guide surfaces, recording means mounted to the movable guide plate of the first guide means for recording a document reading confirmation mark on the document while the document is conveyed along the guide passage, the second guide means being pivotably attached to the first guide means for pivotal movement between a closed position at which the guide passage is formed and an open position at which the guide passage is opened, and the pivotal movement of the subframe between the closed position and the open position with respect to the main frame being associated with the pivotal movement of the second guide means between the closed position and the open position.

In the document reading apparatus according to the sixth aspect of the present invention, the pivotal movement of the subframe between the closed position and the open position with respect to the main frame is associated with the pivotal movement of the second guide means between the closed position and the open position. It is therefore possible to quickly deal with an occurrence of document jamming in the document reading confirmation mechanism or in any part of the document conveyer passage.

According to a seventh aspect of the present invention, there is provided a document reading apparatus comprising a housing including a document feeding portion, a document reading portion and a document discharging portion arranged along a document conveying passage, a portion of the housing comprising an openable door at an intermediate region between the document reading portion and the document discharging portion so that the portion of the housing can be exposed at least partly, and a document reading confirmation mechanism arranged in the intermediate region for recording a document reading confirmation mark on a document to allow confirmation whether the document has been read by the document reading apparatus or not, the document reading confirmation mechanism being accessible by opening the openable door.

In the document reading apparatus according to the seventh aspect of the present invention, a portion of the housing is constituted by an openable door so that the intermediate region between the document reading portion and the document discharging portion can be exposed at least partly, enabling the document reading confirmation mechanism to be incorporated in the document reading apparatus even after the document reading apparatus is manufactured or is sold.

BRIEF DESCRIPTION OF THE DRAWINGS

The present invention will become more apparent from the following description of the preferred embodiments with reference to the accompanying drawings, in which.

DESCRIPTION OF THE PREFERRED EMBODIMENTS

The present invention will now be described with reference to the several embodiments illustrated in FIGS. 1 to 24 in the accompanying drawings.

Figure 1:
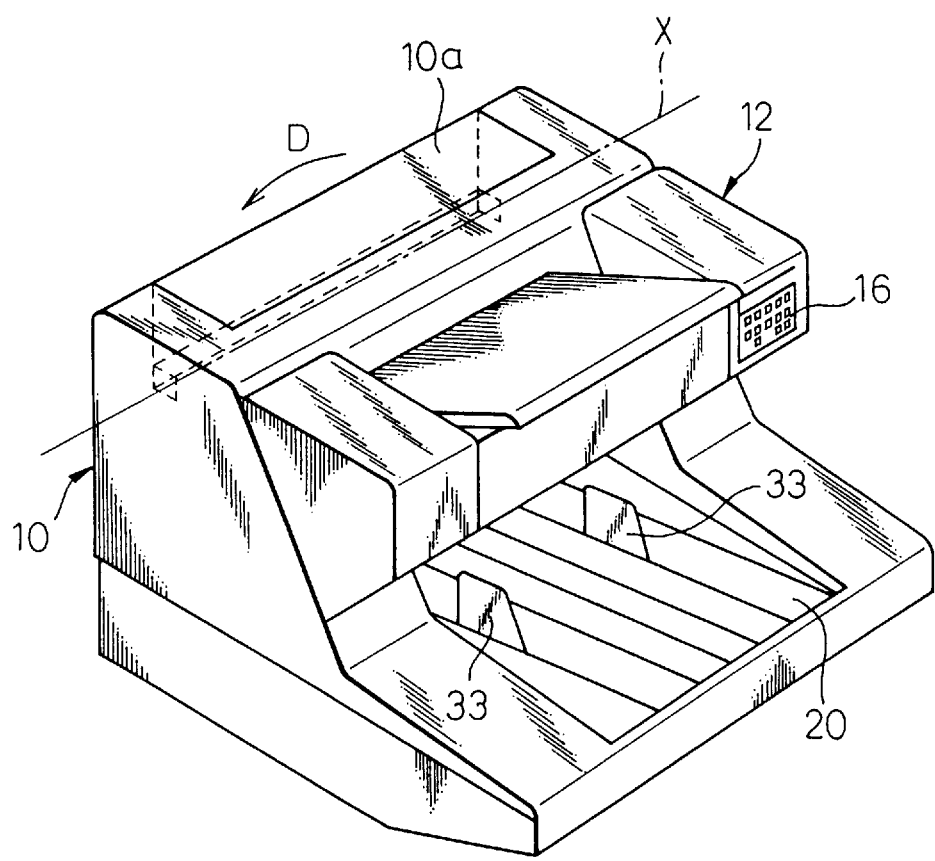
FIG. 1 is a perspective view of the document reading apparatus according to the present invention.
Figure 2:
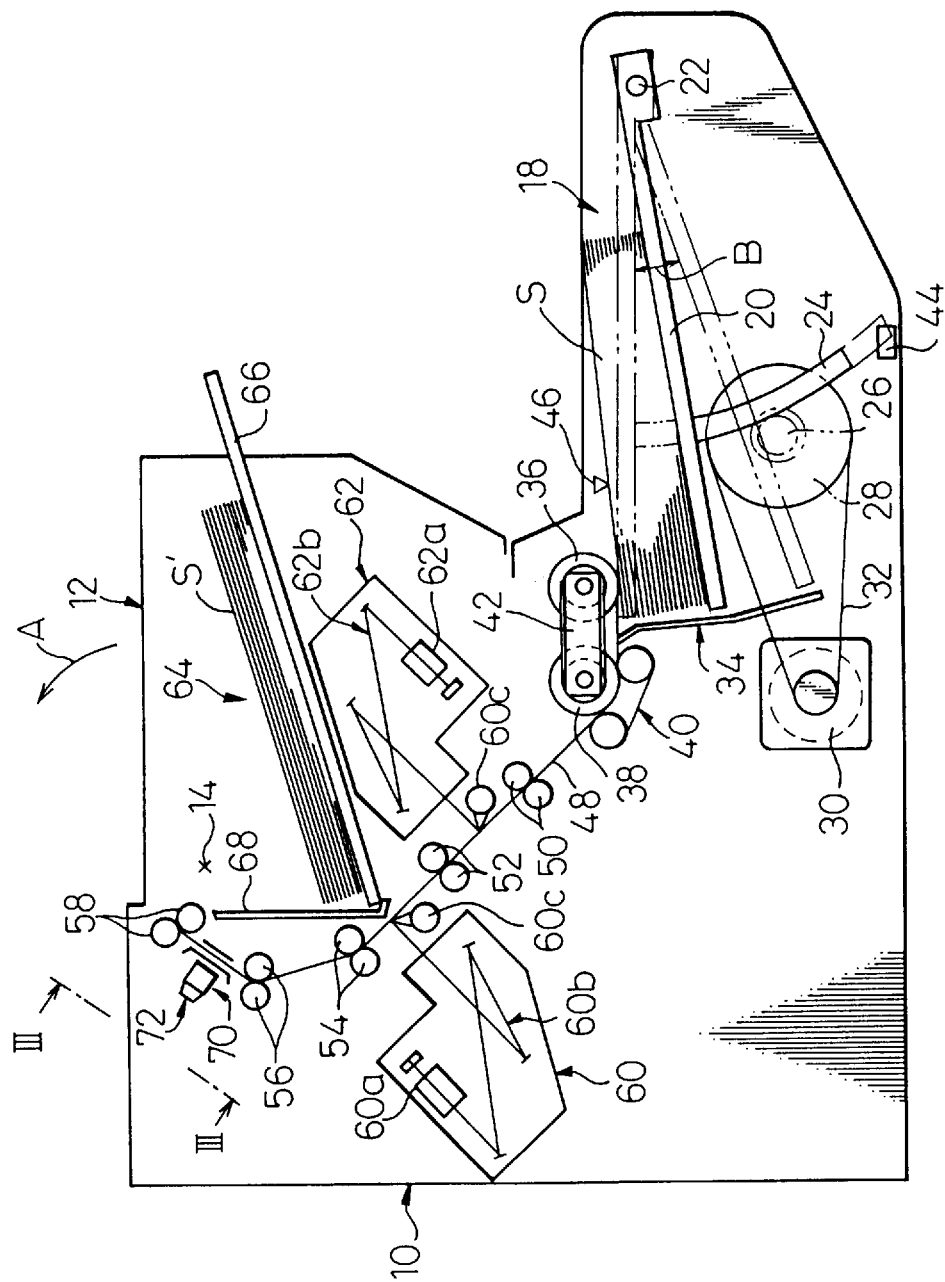
FIG. 2 is a diagrammatic cross-sectional view illustrating the internal elements in the document reading apparatus of FIG. 1.

FIG. 1 shows the appearance of a document reading apparatus having a document reading confirmation mechanism according to the present invention, and FIG. 2 schematically shows elements in the document reading apparatus. The document reading apparatus comprises a housing 10 and an openable or pivotable housing 12 pivotably attached to the housing 10. The pivotable housing 12 is allowed to turn between a closed position and an open position about a pivot axis 14 (designated at X in FIG. 1). In FIGS. 1 and 2, the pivotable housing 12 is in the closed position and is locked by a suitable locking means (not shown). The pivotable housing 12 can be turned from the closed position to the open position in a direction indicated by the arrow A (FIG. 2). In FIG. 1, the reference numeral 16 denotes a control panel which is provided at a right portion on the front end surface of the pivotable housing 12.

Referring to FIG. 2, the document reading apparatus has a document feeding portion 18 on the front side of the bottom part of the housing 12. The document feeding portion 18 includes a feed table 20 which holds a stack S of documents that are to be read, and the feed table 20 is pivotably supported by a shaft 22 to turn in the direction of the arrow B. An arcuate rack 24 is secured to the bottom of the feed table 20 at a substantially central portion thereof. Rack teeth are formed in the arcuate rack 24 along an arc having a center on a longitudinal axis of the shaft 22. A pinion 26 is engaged with the rack teeth of the arcuate rack 24 and is concentrically attached to a pulley 28 that is rotatably held in the housing 12. The pulley 28 is driven for rotation by a suitable drive source such as a step motor 30 via an endless drive belt 32, and the feed table 20 can be turned about the shaft 22. That is, the feed table 20 is turned downwardly toward the bottom of the housing 12 or upwardly, depending upon the rotational direction of the step motor 30. In FIG. 1, the reference numeral 33 denotes a pair of side guide plates for limiting the side surfaces of the document stack S on the feed table 20. The pair of side guide plates 33 are movable depending upon the width of the document.

A gate plate 34 is provided on the rear side of the feed table 20 adjacent to the rear end thereof, and the document stack S is stably held by the feed table 20, due to the provision of the gate plate 34, when the feed table 20 is turned. If the gate plate 34 is not provided, the document stack S will fall from the feed table 20 when it is tilted relative to the horizontal plane. The document stack S, however, is prevented from falling owing to the provision of the gate plate 34. A document delivery roller 36 and a document separator roller 38 are arranged above the gate plate 34, so that the document delivery roller 36 is engaged with the upper surface of the document stack S and the document separator roller 38 is engaged with an endless belt of a document separator belt assembly 40. The document separator roller 38 has a shaft which is rotatably supported by a suitable bearing (not shown) secured in the housing 10, and the document delivery roller 36 has a shaft which is rotatably supported by a pair of side plates 42 (only one of them is shown in FIG. 2) which are pivotably attached to the shaft of the document separator roller 38 on either side of the latter. Accordingly, the document delivery roller 36 is allowed to swing about the shaft of the document separator roller 38. The document separator roller 38 is driven by a suitable electric motor (not shown), and the document delivery roller 36 receives the rotational drive force from the document separator roller 38 via a gear mechanism (not shown) arranged in one of the side plates 42.

The operation of the document feeding portion 18 will be briefly described. First, the feed table 20 is turned to the lowermost position prior to supply the stack S of documents thereon, by driving the step motor 30 to allow the feed table 20 to turn downwardly. When the feed table 20 is turned to the lowermost position, the lower end of the arcuate rack 24 is detected by a suitable sensor 44, and the step motor 30 is no longer driven. The step motor 30 is then driven to allow the feed table 20 to turn upwardly after the stack S of documents is supplied to the feed table 20. The upward movement is continued until the top surface of the document stack S is detected by a sensor 46. That is, when the top surface of the document stack S is detected by the sensor 46, the step motor is stopped.

As the document delivery roller 36 is rotated, a few documents on the top of the document stack S may be delivered beyond the upper end of the gate plate 34, and the leading ends of the documents are introduced into an interface between the document separator roller 38 and the endless belt of the document separator belt assembly 40. The frictional force of the document separator roller 38 acting on the document is greater than the frictional force between the documents and the frictional force of the endless belt of the document separator belt assembly 40 acting the document greater than the frictional force between the documents, and therefore, only the uppermost document which contacts with the document separator roller 38 is separated from the remaining documents and fed by the document separator roller 38 and the endless belt of the document separating belt assembly 40. In this way, the documents are sequentially separated and fed one by one from the document feeding portion 18, and the height of the document stack S decreases correspondingly. At this moment, the step motor 30 is driven again to upwardly turn the feed table 20, but this upward rotational motion is stopped as the upper surface of the stack S of documents is detected by the sensor 46. That is, with the reduction in the height of the document stack S, the feed table 20 is gradually turned upwards and the document stack S assumes an optimum delivery position at all times.

The document delivered from the document feeding portion 18 is conveyed along a document conveyer passage 48 which is formed by a plurality of pairs of document conveyer rollers 50, 52, 54, 56, and 58 which are arranged at suitable distances, and guide plates (not shown) that are suitably arranged among these document conveyer rollers. A document reading portion is provided nearly midway in the document conveyer passage 48, the document reading portion being made up of optical document reading units 60 and 62 which are arranged on both sides of the document conveyer passage 48, as shown in FIG. 2. One optical document reading unit 60 is held by the housing 10, and the other optical document reading unit 62 is held by the pivotable housing 12. When the document passes through the optical document reading units 60 and 62 along the document conveyer passage 48, the data recorded on both surfaces of the document are read out by the respective optical document reading units 60 and 62. Even when the data is recorded on only one surface of the document, the data are read by either one of the optical document reading units 60 and 62. The optical document reading units 60 and 62 are constituted substantially in the same manner, and are equipped with suitable image reading means such as CCD (charge-coupled device) cameras 60a, 62a and optical systems 60b, 62b incorporated in the CCD cameras 60a, 62a, and further include light sources 60c, 62c such as fluorescent lamps, light-emitting diode arrays, etc. for illuminating suitable portions, i.e., document reading portions along the document conveyer passage 48. The document is illuminated by the light sources 60c, 62c as it passes through the document reading portion, and the reflected light is guided to the CCD cameras 60a, 62a through optical systems 60b, 62b; i.e., the CCD cameras 60a, 62a optically read the data recorded in the document, and the data that are read are processed by a controller (not shown) inclusive of a microcomputer.

The document which has passed through the optical document reading units 60 and 62 is discharged into a document discharge portion 64 by a final pair of document conveyer rollers 58 functioning as document discharge rollers. The document discharge portion 64 is provided in the pivotable housing 12 above the optical document reading unit 62. The document discharge portion 64 includes a document receiving table 66 and a document holding plate 68 arranged on the rear side of the document receiving table 66. The document which is read is discharged onto the document receiving table 66 and is stacked as designated by S'. When the documents are jammed in the way of the document conveyer passage 48, the pivotable housing 12 is turned into the open position so that the documents can be easily removed.

In this document reading apparatus, when a plurality of documents are fed at once from the document feeding portion 18, the data recorded on the overlapped surfaces of the documents are not read. Besides, the document discharge unit is not capable of identifying which documents are fed in duplicate. According to the present invention, however, a document reading confirmation mechanism 70 is provided between the document delivery rollers 56 and the document discharge rollers 58, as shown in FIG. 2, and whether the data of the documents are read or not is confirmed by the document reading confirmation mechanism 70. The document reading confirmation mechanism 70 includes, for example, an ink jet type printing head 72. A suitable document reading confirmation mark such as a suitable symbol or a serial number is printed onto the document that has passed through the optical document reading units 60 and 62, and then it is possible to make sure later whether the data of the documents are read or not. When the documents are double-fed, for instance, the document reading confirmation mark is not recorded on the lower document. Therefore, it can be confirmed whether the data of the documents are read or not, depending upon presence or absence of the document reading confirmation mark.

Figure 3:
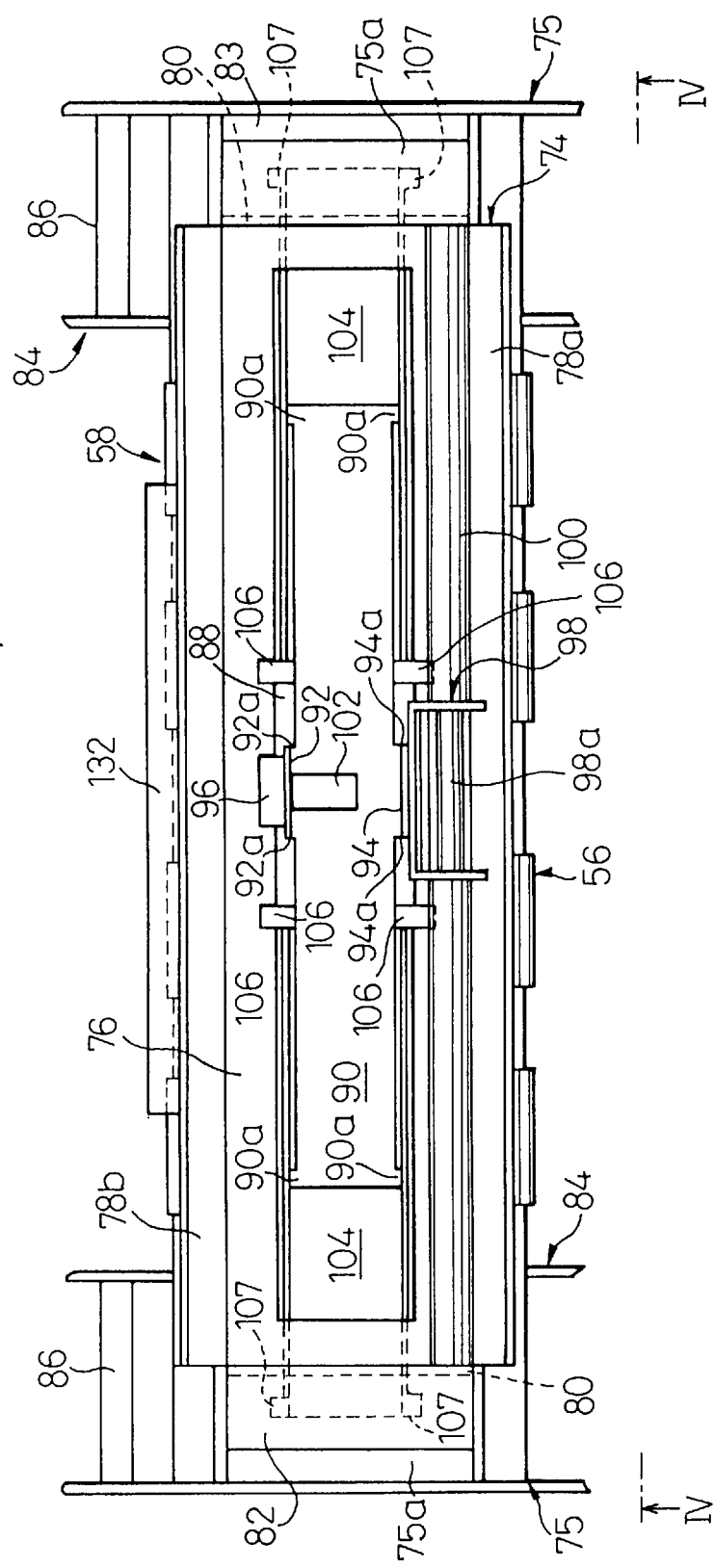
FIG. 3 is a plan view, in an enlarged scale, of the document reading confirmation mechanism of the present invention, taken along the line III—III in FIG. 2, with some elements removed to clarify the figure.
Figure 4:
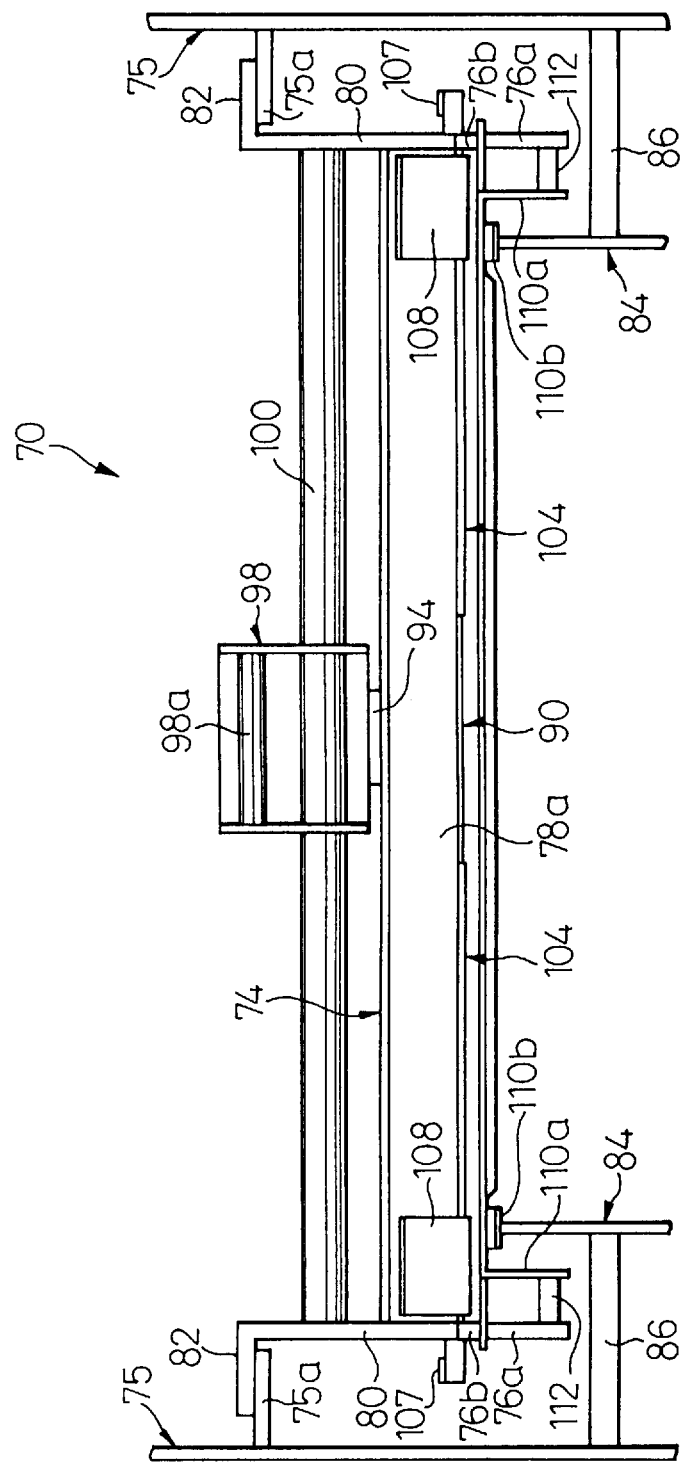
FIG. 4 is an elevational view of the document reading confirmation mechanism, viewed in the direction IV of FIG. 3.
Figure 5:
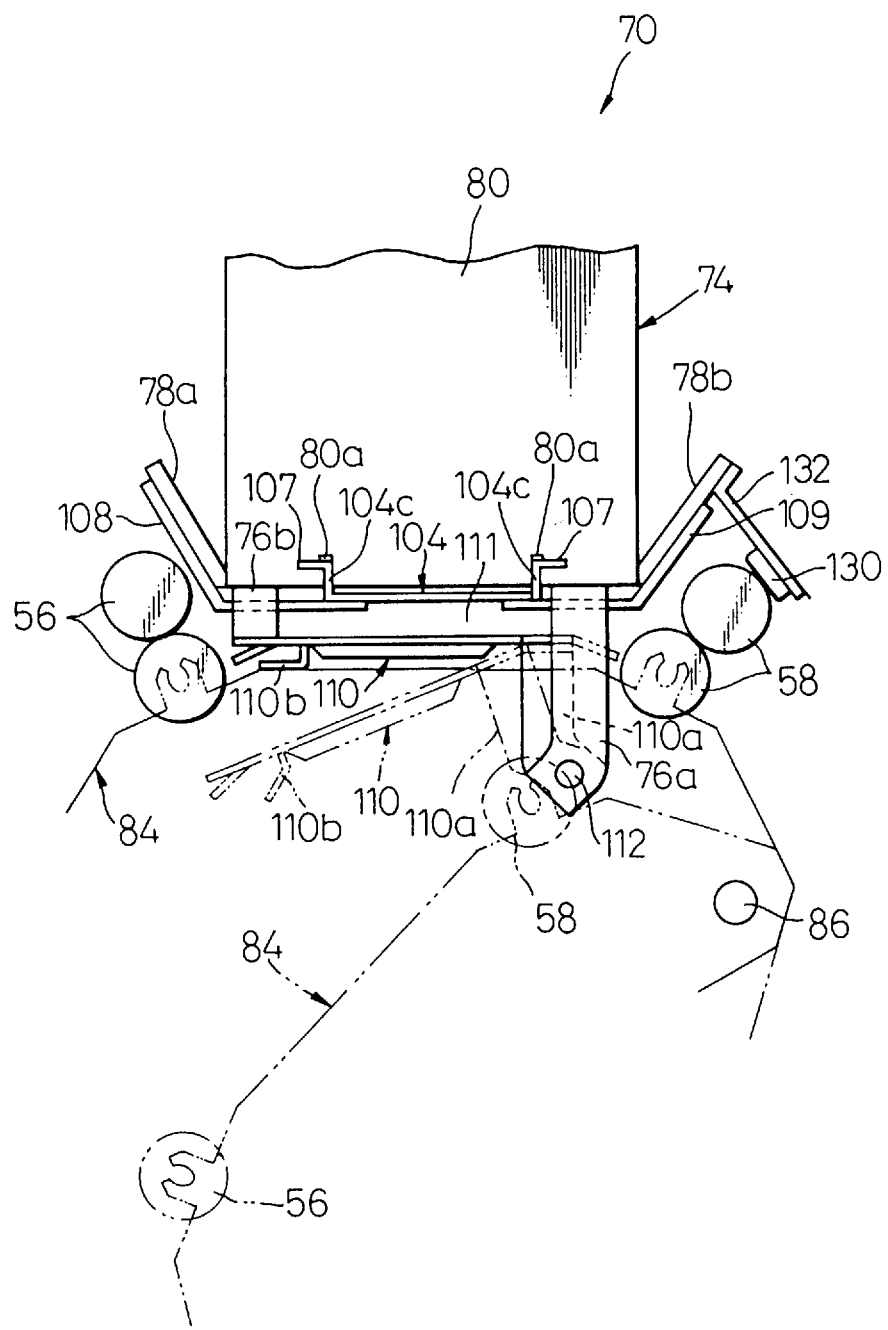
FIG. 5 is an end view of the document reading confirmation mechanism of FIGS. 3 and 4.

FIGS. 3 to 5 show the details of the document reading confirmation mechanism 70 according to an embodiment of the present invention. The document reading confirmation mechanism 70 includes a guide means providing a guide surface for the document which is conveyed along the document conveyer passage 48. The guide means has a support frame 74 which is held by a main frame 75 of the housing 10. In particular, the support frame 74 comprises a rectangular plate 76 (FIG. 3) extending transversely to the document conveyer passage 48, inclined plates 78a and 78b (FIG. 5) extending from the rectangular plate 76 at both sides thereof at angles relative to the 76 one the opposite side of the document conveyer passage 48, end plates 80 upstanding on the rectangular plate 76 at both ends thereof, and mounting plates 82 outwardly extending from the tops of the end plates 80 at right angles. The mounting plates 82 are secured to mounting seats 75a inwardly extending from the main frame 75.

Subframes 84 of the pivot housing 12 are shown in FIGS. 3 to 5. The subframes 84 are pivotably supported by short shafts 86 which inwardly extend from the main frame 75 at both sides thereof, and the pivot housing 12 is allowed to turn between the closed position and the open position as described previously. The axes of the two short shafts 86 coincide with the pivot axis 14 of the pivot housing 12, as shown in FIG. 2. As will be apparent from FIGS. 3 and 5, the pairs of document conveyer rollers 56, 58 are supported on one hand by the main frame 75 and on the other hand by the sub-frame 84. To simplify the drawing, document conveyer rollers 56 and 58 are omitted from FIG. 4. The document conveyer rollers 56 and 58 supported by the main frame 75 are drive rollers to which a rotational drive force is transmitted from a suitable common drive source such as a step motor (not shown) via a transmission means such as a drive belt or a gear train, and the document conveyer rollers 56 and 58 supported by the sub-frame 84 are driven rollers. This will be applied to the other pairs of document conveyer rollers 50, 52 and 54. In FIG. 5, the sub-frame 84 when in the closed position is shown by a solid line, and the sub-frame 84 when the open position is shown by the semi-broken line. According to the above-described arrangement, even when the documents are jammed in the document conveyer passage 48, the documents can be easily removed by turning the pivot housing 12 to the open position. Moreover, maintenance and checking can be quickly carried out since the interior of the document reading apparatus is easily accessible.

The rectangular plate 76 of the support frame 74 has a rectangular opening 88 formed along the lengthwise direction thereof, and a movable guide plate 90 is arranged in the rectangular opening 88 in the lengthwise direction, the length of the movable guide plate 90 being shorter than the length of the rectangular opening 88. The movable guide plate 90 not only provides a guide surface for the document conveyed by document conveyer rollers 56 and document conveyer rollers 58, but also provides a printing head mounting portion for the printing head 72.

In particular, the central portion of the movable guide plate 90 serves as the printing head mounting portion, and upright walls 92 and 94 are integrally formed with the printing head mounting portion at both sides thereof. The printing head 72 is detachably mounted between the upright walls 92 and 94, as will be described in detail later. A protruded piece 96 is provided on one outer surface of the upright wall 92, the protruded piece 96 being brought into a slidable contact with the rectangular plate 76 of the support frame 74. A bracket 98 having a U-shape in cross section is provided on the outer surface of the other upright wall 94, the bracket 98 having holes formed in the opposite side walls thereof to slidably receive a guide rod 100. The guide rod 100 is arranged along the lengthwise direction of the rectangular opening 88, and is supported by the plates 80 at both ends of the support frame 74, whereby the movable guide plate 90 is allowed to move in the rectangular opening 88 along the lengthwise direction thereof.

The movable guide plate 90 has a slot 102 formed at the printing head mounting portion and extending from the inner surface of the upright wall 92 toward the upright wall 94. When the printing head 72 is mounted to the printing head mounting portion, the ink jet nozzles of the printing head 72 are exposed to the opposite side of the movable guide plate 90 via the slot 102, and ink droplets can be ejected from the ink jet nozzles onto the document through the slot 102. According to the above mentioned arrangement, as the movable guide plate 90 with the printing head 72 is allowed to move in the transverse direction to the document travelling direction, it is possible to record the document reading confirmation mark at any position along of the document width. That is, the document confirmation mark can be recorded at any position, not only on the marginal region of the leading and trailing ends of the document but also on the marginal region of the right and left ends of the document.

Figure 6:
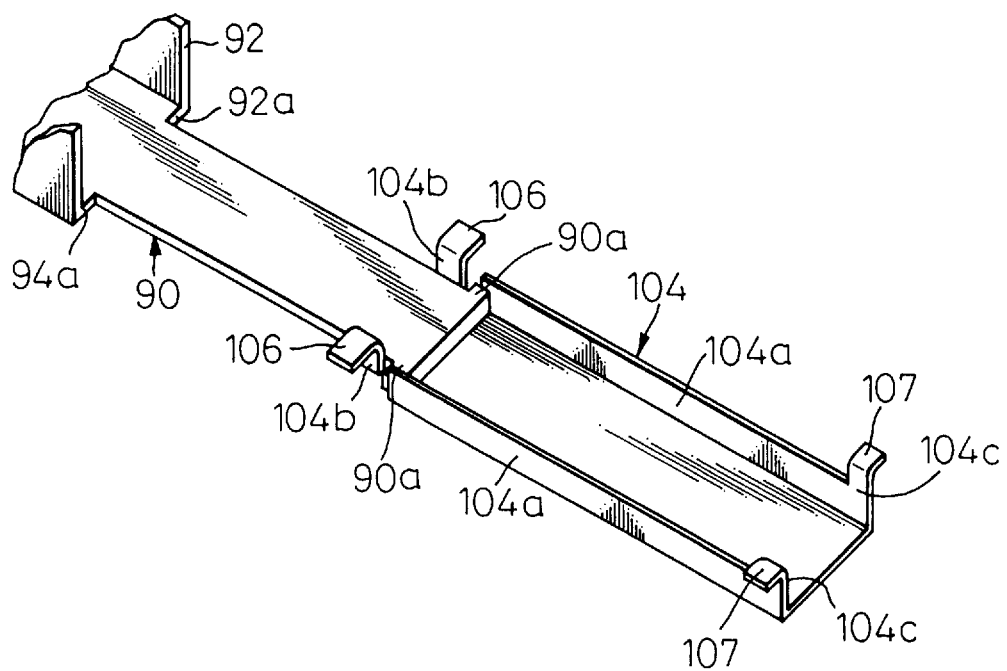
FIG. 6 is a perspective view of the movable guide plate and the auxiliary guide slidably engaged with one end thereof, of the document reading confirmation mechanism shown in FIGS. 3 and 4.

Auxiliary guides 104 are slidably arranged in the rectangular opening 88 of rectangular plate 76 of support frame 74 at the end regions thereof. The auxiliary guides 104 cooperate with the movable guide plate 90 to provide the guide surface for the document. As best shown in FIG. 6, each of the auxiliary guides 104 has a rectangular shape and side walls 104a upwardly extending from the side edges of the auxiliary guide 104. The auxiliary guides 104 are slidably held in grooves 80a formed in the end plates 80 of the support frame 74. The auxiliary guides 104 have upright pieces 104b formed independently of the side walls 104a on the inner ends of the auxiliary guides 104 on both side edges. The distance between the upright pieces 104b on both side edges is slightly smaller than the distance between the side walls 104a.

Lateral extensions 106 extend outwardly from the upright pieces 104b at right angles, and slidably engage with the side edges of the rectangular opening 88. Upright pieces 104c are formed integrally with the side walls 104a at the outer ends of the auxiliary guides 104 on both side edges thereof, and lateral extensions 107 outwardly extend from the upright pieces 104c at right angles. When the auxiliary guides 104 move inwardly, i.e., move toward the center of the movable guide plate 90, the lateral extensions 107 come into contact with the outer surfaces of the end plates 80 to limit the inward movement of the auxiliary guides 104. As best shown in FIG. 5, support plates 108 and 109 are mounted on the inclined plates 78a and 78b of support frame 74b on both sides thereof, and extend toward the lower side of the rectangular opening 88 to slidably hold the auxiliary guides 104. Accordingly, the auxiliary guides 104 are allowed to stably move along the rectangular opening 88.

As is apparent from FIGS. 3 and 6, the respective half portions of the movable guide plate 90 are slidably held in the respective auxiliary guides 104, so that the auxiliary guides 104 are telescopically fitted on the end portions of the respective half portions of the movable guide plate 90. Lateral protrusions 90a are formed at the ends of the movable guide plate 90 on both side edges thereof, the outer size between the outer surfaces of the lateral protrusions 90a corresponding to the inner size of the inner surfaces of the side walls 104a of the auxiliary guide 104. The outer size between the outer surfaces of the lateral protrusions 90a is larger than the size between the inner surfaces of the upright pieces 104b of the auxiliary guide 104. Accordingly, the lateral protrusions 90a of the one half portions of the movable guide plate 90 can abut against the upright portions 104b of the auxiliary guide 104. As best shown in FIG. 6, on the other hand, shoulder portions 92a and 94a are formed on the movable guide plate 90 at the upright walls 92 and 94. The shoulder portions 92a and 94a can abut against the upright portions 104b of the auxiliary guides 104.

By this arrangement of the auxiliary guides 104 which are slidably engaged with the movable guide plate 90, the movable guide plates 90 can provide a guide surface for the entire surface of the document in cooperation with the auxiliary guides 104, without excessively increasing the length of the movable guide plate 90, when the movable guide plate 90 is moved in any direction to record the document reading confirmation mark on the document at any position thereof. This will be further described.

Figure 7:
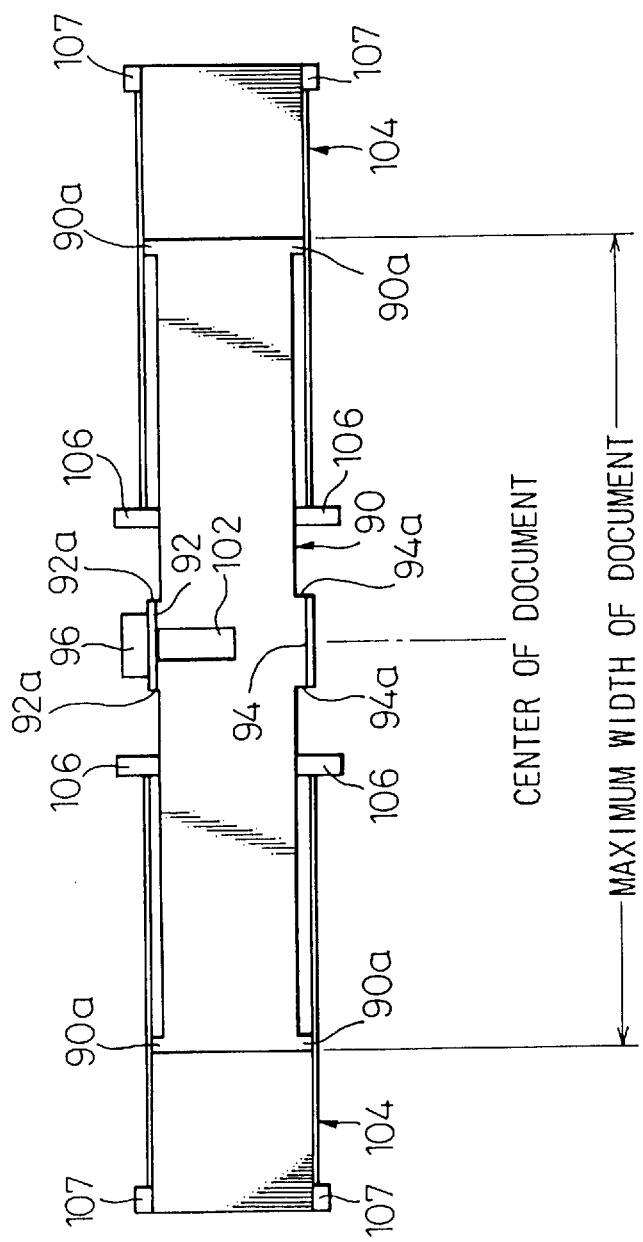
FIG. 7 is a plan view illustrating a relationship between the maximum width of the document and the auxiliary guides at both ends thereof when the movable guide plate is at the central position.

Referring to FIG. 7, when the movable guide plate 90 is positioned at the central position to record the document reading confirmation mark on the document at the center thereof, and when the maximum width of the document corresponds to the full length of the movable guide plate 90, the movable guide plate 90 alone can provide a guide surface for the entire surface of the document.

Figure 8:
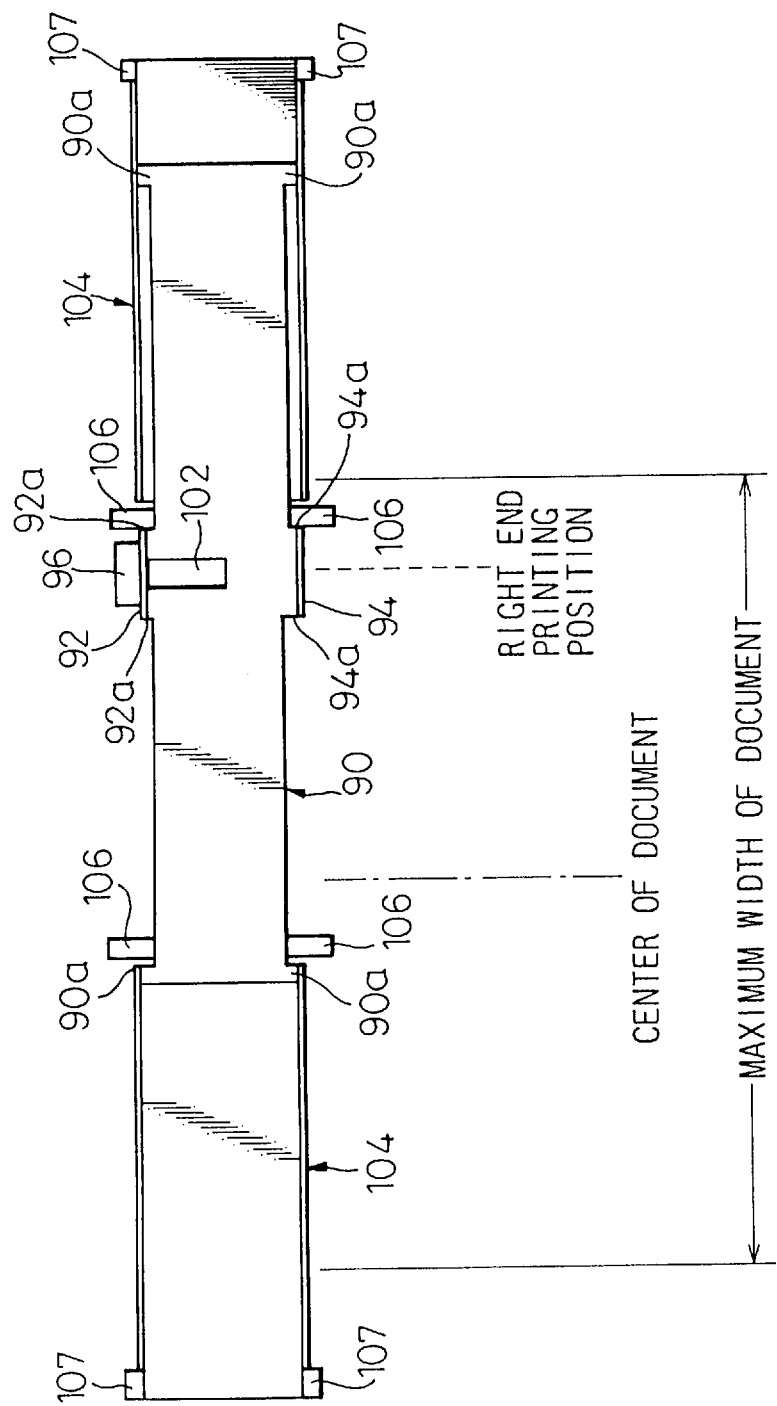
FIG. 8 is a plan view illustrating a relationship between the maximum width of document and the auxiliary guides at both ends thereof when the movable guide plate is at the right end printing position.
Figure 9:
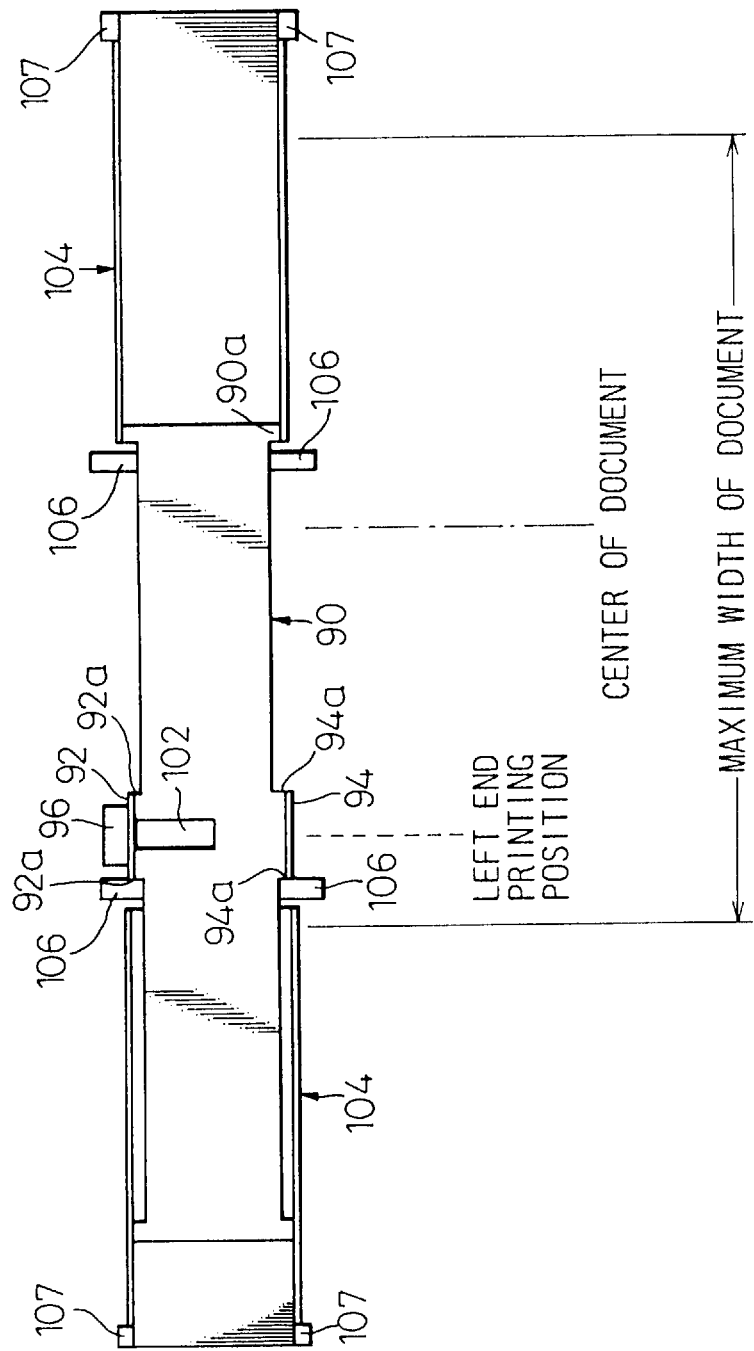
FIG. 9 is a plan view illustrating the relationship between the maximum width of the document and the auxiliary guides, at both ends thereof, when the movable guide plate is at the left end printing portion.

As shown in FIG. 8, when the movable guide plate 90 is moved to the right end printing position to record the document reading confirmation mark on the document at the right end thereof, the movable guide plate 90 cannot provide a guide surface for the left surface portion of the document, and in this case, a guide surface for the left surface portion of the document is provided by the left auxiliary guide 104. Referring to FIG. 9, similarly to the case of FIG. 8, when the movable guide plate 90 is moved to the left end printing position to record the document reading confirmation mark on the document at the left end thereof, the movable guide plate 90 cannot provide a guide surface for the right surface portion of the document, and in this case, a guide surface for the right surface portion of the document is provided by the right auxiliary guide 104. When the movable guide plate 90 is moved depending upon a selected recording position of the document reading confirmation mark, the auxiliary guides 104 are suitably moved, following the motion of the movable guide plate 90, with the lateral extensions 106 in abutment against the lateral protrusions 90a or against the shoulder portions 92a and 94a.

In the above-mentioned construction, it will be apparent that the movable guide plate 90 and the auxiliary guides 104 cooperate together to provide a guide surface for the entire surface of the document without excessively increasing the length of the movable guide plate 90. When it is desired that the movable guide plate 90 only provides a guide surface for the entire surface of the document having a maximum width without using the auxiliary guides 104, it is necessary to increase the length of the movable guide plate 90 to a value approximately two times of the length of the movable guide plate 90 when the auxiliary guides 104 are used. In such a case, the range of movement of the movable guide plate 90 is considerable increased, and a correspondingly large housing 10 must be employed to accommodate the movable guide plate 90. In FIGS. 7 to 9, the length of the movable guide plate 90 corresponds to the maximum width of the document. However, it is possible to change the length of the movable guide plate 90 so that the maximum width of the document may be larger or smaller than the length of the movable guide plate 90, and in this case, it is possible to determine the length of the movable guide plate 90 in relation to the width of the housing 10 of the document reading apparatus.

As described above, a guide surface is provided for the document by the guide means including the movable guide plate 90 and the auxiliary guides 104 when the document is conveyed between the document conveyer rollers 56 and the document conveyer rollers 58. Preferably, another guide means is necessary for providing a further guide surface in an opposite relationship with the first mentioned guide surface to stably convey the document. In this embodiment, the latter guide means comprises an openable or movable guide assembly 110 (FIGS. 4 and 5). In FIGS. 4 and 5, the movable guide assembly 110 is arranged under the rectangular plate 76 of the support frame 74 and has approximately the same size and the same shape as the rectangular plate 76. A guide passage 111 is thus formed by the opposing guide surfaces between the document conveyer rollers 56 and the document conveyer rollers 58, the guide passage 111 constituting a part of the document conveyer passage 48.

Arms 110a hang from the movable guide assembly 110, and arms 76a hang from the rectangular plate 76 of support frame 74, the arms 76a and 110a being arranged on the side near the document discharge rollers 58. Short shafts 112 extend from the lower ends of arms 76a of rectangular plate 76, and arms 110a of the movable guide assembly 110 are pivotably attached to the short shafts 112, so that the movable guide assembly 110 is allowed to turn about the short shafts 112. In FIG. 5, the movable guide assembly 110 is shown by the solid line when in the closed position and is shown by a two-dot chain line when in the open position. Stoppers 76b are fitted to the lower side of both ends of the rectangular plate 76 of support frame 74 near the document conveyer rollers 56. The stoppers 76b define the closed position of the movable guide assembly 110. That is, as will be apparent from FIGS. 4 and 5, the movable guide assembly 110 becomes closed when it is brought into contact with the stoppers 76b. The movable guide assembly 110 is provided with leaf springs 110b near the ends of the movable guide assembly 110 and near the document conveyer rollers 56. The leaf springs 110b are engaged with the sub-frame 86. Therefore, when the pivotable housing 12 is brought into the closed position, the leaf springs 110b are resiliently deformed upon engagement with the sub-frame 84, so that the movable guide assembly 110 is resiliently pressed onto the stoppers 76b and is locked at the closed position. When the pivotable housing 12 is turned from the closed position to the open position, the movable guide assembly 110 is unlocked and can be turned from the closed position to the open position.

Figure 10:
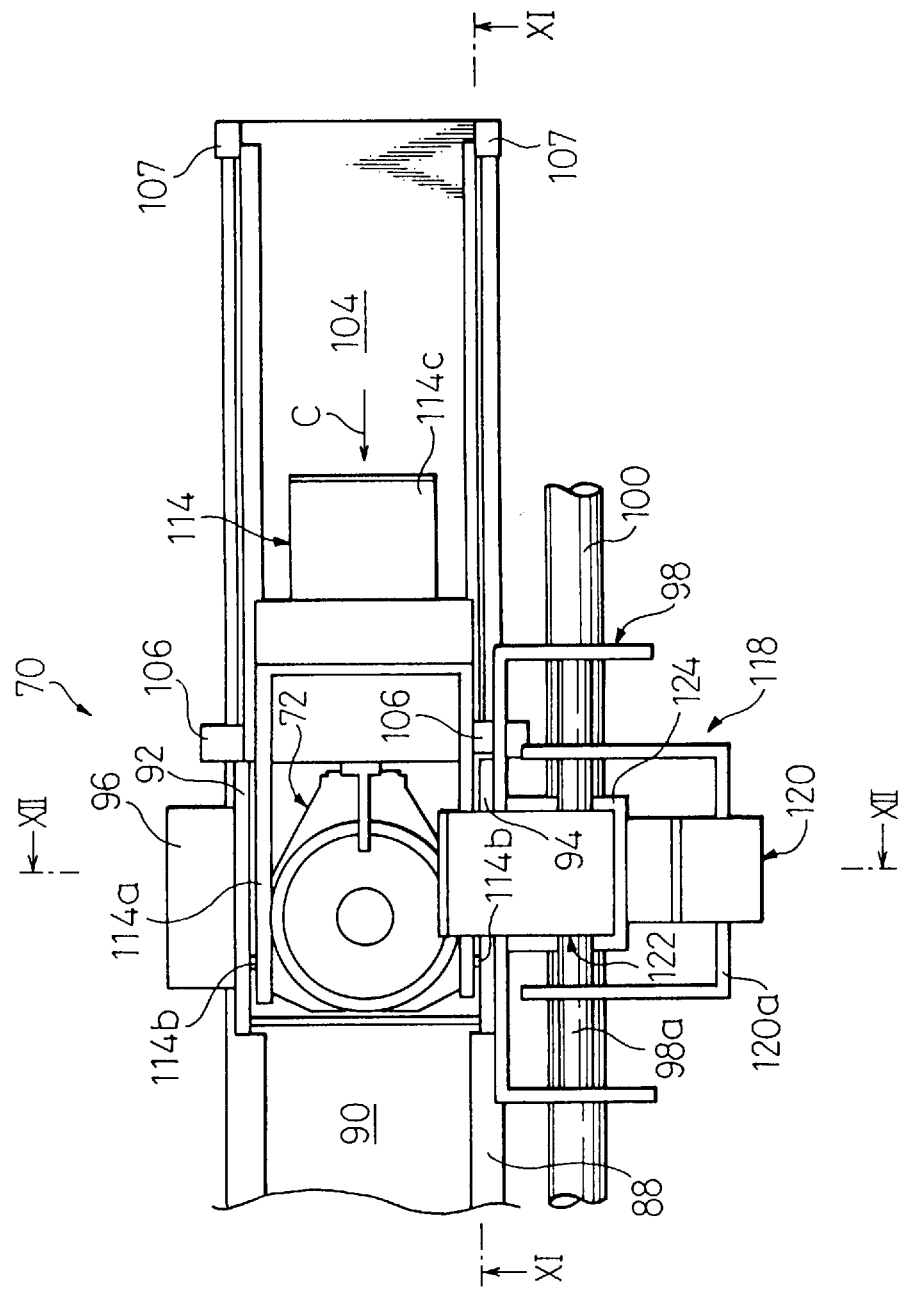
FIG. 10 is a partial plan view of the printing head and the ink jet type printing head mounted to the movable guide plate.
Figure 11:
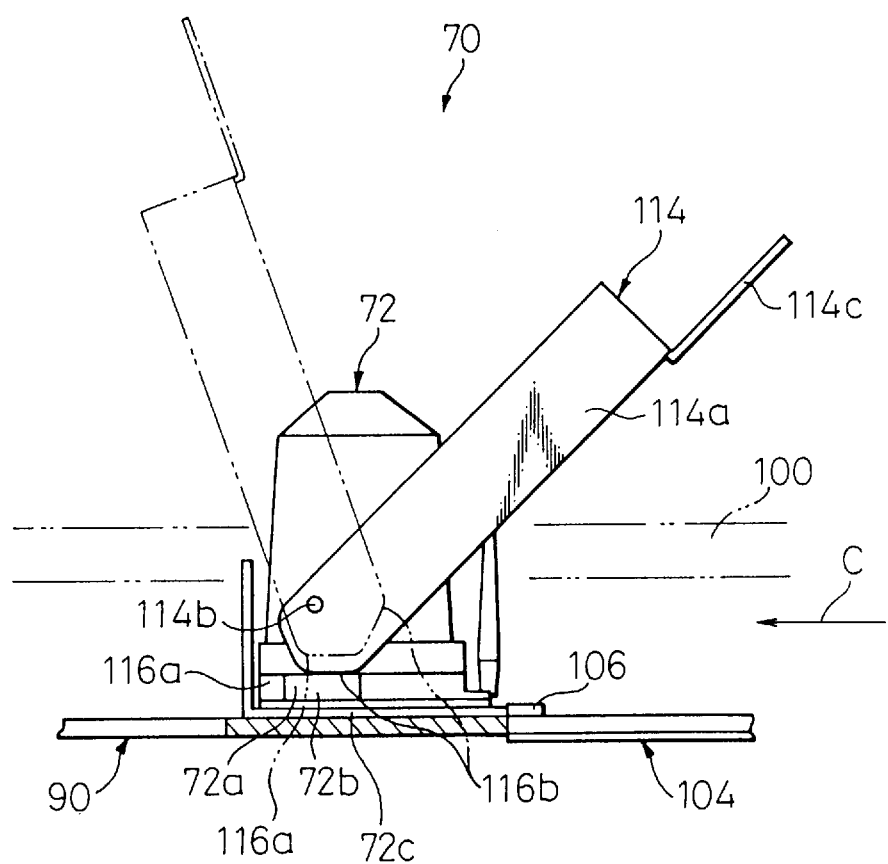
FIG. 11 is a side view of the printing head and the ink jet type printing head, viewed in the direction XI of FIG. 10, illustrating the attaching and detaching the printing head.
Figure 12:
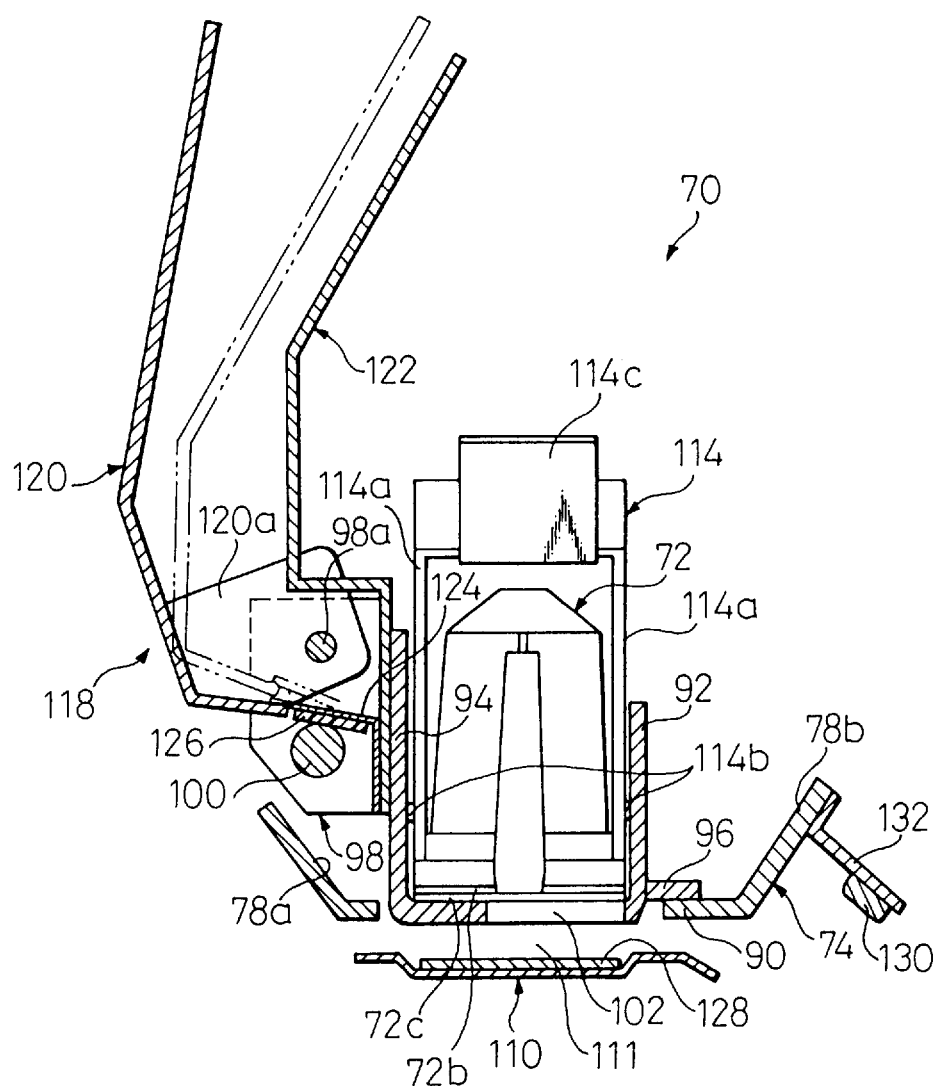
FIG. 12 is a sectional view of the printing head and the ink jet type printing head, taken along the line XII—XII of FIG. 10, illustrating a manual operating means for positioning and locking the printing head.

FIGS. 10 to 12 show the printing head 72 being mounted onto the printing head mounting portion of the movable guide plate 90. In particular, the printing head 72 is arranged between upright walls 92 and 94, and is secured by a fork-shaped locking lever 114 that can be unlocked. As will be apparent from FIGS. 10 and 12, the locking lever 114 has a pair of arms 114a, and inclined surfaces 116a and 116b at the lower ends of the arms 114a with an obtuse angle between the inclined surfaces 116a and 116b, as shown in FIG. 11. The arms 114a are arranged between the upright walls 92 and 94, and are rotatably attached to the upright walls 92 and 94 by pivot pins 114b protruding from the upright walls 92 and 94 near the lower ends. The pivot pins 114b are arranged at positions offset from the longitudinal axis of the arms 114a. Therefore, the distance between the pivot axis of the pivot pin 14b and the inclined surface 116a is shorter than the distance between the pivot axis of the pivot pin 14b and the inclined surface 16b. As will be described later, the inclined surface 116b functions as an unlocking surface and the inclined surface 116b functions as a locking surface.

An operation piece 114c is provided at the top portion of the locking lever 114 for moving the locking lever 114 between the locking position indicated by the solid line and the unlocking position indicated by the two-dot chain line (FIG. 11). The printing head 72 includes extensions 72a at the bottom thereof, and a circuit board 72c is arranged on the bottom side of the printing head 72a via an elastic material such as a rubber plate 72b. When the printing head 72 is mounted, the locking lever 114 is placed at the unlocking position (two-dot chain line) and, in this state, the printing head 72 is introduced into the printing head mounting portion in the direction of the arrow C (FIGS. 10 and 11). Then, as the printing head 72 is brought into a predetermined position shown in FIGS. 10 and 11, the extensions 72a (FIG. 11) of the printing head 72 are placed under the unlocking surface 116a of the locking lever 114. Then, as the locking lever 114 is turned from the unlocking position (two-dot chain line) to the locking position (solid line), the locking surface 116bof the locking lever 114 is pressed onto the extensions 72a of the printing head 72 and, at the same time, the rubber plate 72b of the printing head 72 undergoes compressive deformation to some extent. Accordingly, the printing head 72 is firmly held in the printing head mounting portion. Therefore, the ink jet nozzle is exposed through the open slot 102, and ink droplets can be injected from the ink jet nozzle to the document through the open slot 102.

The printing head 72 is allowed to move together with the movable guide plate 90 in the transverse direction relative to the guide passage 111 so that it is possible to write the document reading confirmation mark on the document at any position using the printing head 72. However, to ensure the recording of the document reading confirmation mark on the document at any position, the printing head 72 must be positioned at a selected transverse position relative to the guide passage 111 and fixed thereat. In this embodiment, the bracket 98, which is attached to the outer surface of the upright wall 94, has a positioning and locking mechanism 118 including a locking lever 120 and a support lever 122, as shown in FIGS. 10 and 12. The locking lever 120 has a U-shaped frame 120a integrally formed therewith at the lower end, and the U-shaped frame 120a is rotatably supported by a shaft 98a which is attached to both side walls of the bracket 98. As best shown in FIG. 12, the locking lever 120 is coupled at its lower end to a leaf spring 124 of nearly an L-shape, and the leaf spring 124 is secured to the rear wall surface of the bracket 98. A suitable friction member such as a friction plate 126 made of a rubber is attached to the leaf spring 124, and is elastically pressed onto the guide rod 100 by the resilient force of the leaf spring 124.

The support lever 122 is integrally formed with the rear wall of the bracket 98 and is aligned with the locking lever 120 in the direction perpendicular to the guide rod 100. Referring to FIG. 12, the locking lever 120 is allowed to turn between a locking position indicated by the solid line and an unlocking position indicated by the two-dot chain line. That is, the locking lever 120 and the support lever 122 are grasped by the thumb and index fingers of the operator so as to turn the locking lever 120. As will be apparent from the above description, when the locking lever 10 is placed at the locked position, the friction plate 126 is elastically pushed onto the guide rod 100 and is brought into frictional engagement therewith. Therefore, the bracket 98 does not slide relative to the guide rod 100. That is, the printing head 72 and the movable guide plate 90 are fixed at a positions shown in FIGS. 10 and 12. On the other hand, when the locking lever 120 and the support lever 122 are grasped by the thumb and index finger of the operator so as to turn the locking lever 120 into the unlocking position and, these levers 120 and 122 are then moved along the guide rod 100, in order to move the bracket 98 together with the printing head 72 and the movable guide plate 90 in a transverse direction relative to the guide passage 111. That is, by using the above mentioned positioning and locking mechanism 118, the printing head 72 can be moved to any position and can be secured at a position along the transverse direction of the guide passage 111.

In the operation of the above mentioned document reading confirmation mechanism 70, prior to carrying out the reading operation by the document reading apparatus shown in FIGS. 1 and 2, the positioning and locking mechanism 118 is manually operated to place the printing head 72 at a predetermined position in the transverse direction to the guide passage 111 depending upon the size of the document and the position at which the document reading confirmation mark is to be recorded. Then, the document reading apparatus is started, and the printing head 72 also operates at a predetermined timing depending upon the size of the document. A document reading confirmation mark is recorded on the document at a selected position thereof, while the document passes through the guide passage 111. The printing head 72 is constructed such that, for example, a 16×16 dot matrix letter, a serial number or a suitable symbol is printed, as a document reading confirmation mark, onto the document.

The housing 10 includes a portion 10*a* in the form of a pivotable door which turns about the axis X, as shown in FIG. 1. The pivotable door 10*a* incorporates a suitable releasable locking mechanism (not shown), and is normally maintained in the closed position. Upon unlocking the locking mechanism, the pivotable door 10*a* is allowed to open, as shown by the arrow D. In this condition, the positioning and locking mechanism 118 can be manually operated. In addition, it is possible to obtain an access to the document reading confirmation mechanism 70 while the pivotable door 10*a* is opened.

In the case of the ink jet type printing head 72, the ink-jet nozzle may be clogged, and an operator may try to provisionally operate the ink jet nozzle to inject ink droplets, prior to the actual use of the document reading confirmation mark, to eliminate clogging, as is well known. In this case, no document is present in the guide passage 111 and the ink droplets may adhere to the guide surface of the movable guide assembly 110, and when the document reading confirmation mark is recorded on a subsequently delivered document, the document may be contaminated with the adhered ink. Therefore, the movable guide assembly 110 in this embodiment includes an ink absorbing strip 128, as shown in FIG. 12, so that the ink absorbing strip 128 also provides a guide surface for the document. Preferably, the ink absorbing strip 128 is made of a composite structure which has been used as a paper diaper or a sanitary napkin. The ink that is once absorbed by the ink absorbing strip 128 does not ooze out on the surface. Therefore, the document is not contaminated with the ink.

When the document having a document reading confirmation mark recorded thereon passes through the document conveyer rollers 58, the drive roller thereof may be contaminated with the ink by the document reading confirmation mark on the document. That is, when the document reading confirmation mark is recorded on the document by the printing head 72 and conveyed to the document conveyer rollers 58, the surface of the roller could be contaminated with the ink of the document reading confirmation mark. The contaminated roller in turn contaminates the subsequent documents. Therefore, a cleaner 130 made of, for example, a felt or a blotting paper is adapted to the drive roller 58 in this embodiment, so that the cleaner 130 contacts the surface of the document conveyer roller 58, as best shown in FIG. 5. The cleaner 130 is held by a mounting plate 132 extending in a cantilevered fashion from the inclined plate 78*b* of the support frame 74*a*. The mounting plate 132 extends over a recording range of the printing head 72, and the cleaner 130 extends in the same length as the mounting plate 132, as is obvious from FIG. 3. Therefore, even when the document conveyer roller (drive roller 58) is contaminated with the document reading confirmation mark on the document, the contamination is readily wiped off by the cleaner 130.

The above mentioned embodiment shows the positioning locking mechanism 118 which is manually operated to bring the printing head 72 into a desired position along the transverse direction of the guide passage 111. However, it is possible to automatically move and position the printing head 72. In the modified embodiment shown in FIG. 13, for instance, a guide screw 100' is used instead of the guide rod 100, and is rotatably supported between the end plates 80 of the support frame 74 via bearings 134. A nut 136 is secured by the upright wall 94 of the movable guide plate 90 and engaged with the guide screw 100'. Furthermore, a gear 138 is attached to the end of the guide screw 100' and engaged with a gear 142 fitted to an output shaft of a suitable drive motor such as a step motor 140. By driving the step motor 140, the nut 136 moves along the guide screw 100', and the printing head 72 on the movable guide plate 90 is moved to any position and is secured along the transverse direction of the guide passage 111. The step motor 140 is controlled by a controller in the document reading apparatus. Such a control operation is carried out as the operator sets and inputs a position for recording the document reading confirmation mark.

In the embodiment shown in FIGS. 3 to 12, if the ink absorbing strip 128 is excessively contaminated, the documents will then be contaminated by the ink absorbing strip 128. Accordingly, the ink absorbing strip 128 must be periodically replaced. In this embodiment, the ink absorbing strip 128 can be replaced by opening the movable guide assembly 110. However, even when the movable guide assembly 110 is placed at the open position, the support frame 74 is positioned just above the opened movable guide assembly 110 and hence, the replacement of the ink absorbing strip 128 is a relatively cumbersome operation.

Figure 14:
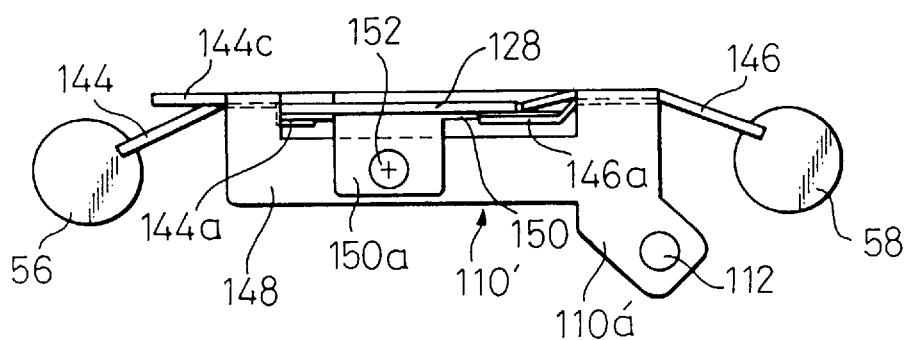
FIG. 14 is an end view of another example of the movable guide assembly that forms a part of the document reading confirmation mechanism.
Figure 15:
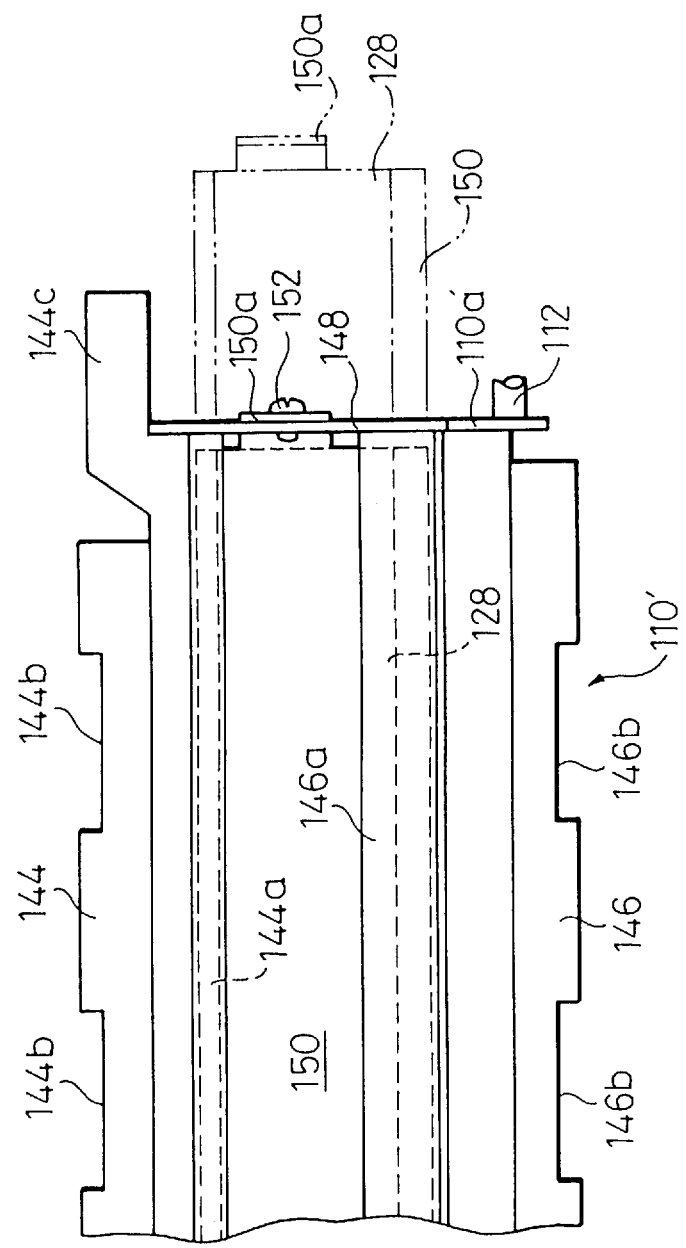
FIG. 15 is a partial bottom view of the document reading confirmation mechanism of FIG. 14.

FIGS. 14 and 15 show the modified embodiment of the movable guide assembly 110. The movable guide assembly 110' according to this modified embodiment is so constructed that the ink absorbing strip 128 can be easily replaced. In particular, the movable guide assembly 110' includes a pair of guide plates 144 and 146 that extend in the transverse direction relative to the document conveying direction, and end plates 148 integrally hanging from the ends of the guide plates 144 and 146. Portions of the end plates 148 are formed as arms 110a' which are pivotably received by short shafts 112 which protrude from the arms 76a of the rectangular plate 76. An opening is formed in the lengthwise direction between the guide plates 144 and 146, and guide rail pieces 144a and 146b are mounted on the lower side of the guide plates 144 and 146 along the opening in the lengthwise direction (FIG. 14). Guide slots are formed between the guide plates 144, 146 and the guide rail pieces 144a, 146a, respectively, and a holder plate 150 holding the ink absorbing strip 128 is withdrawably inserted in the guide slots. The ink absorbing strip 128 is attached to the holder plate 150 by an adhesive, a double-sided adhesive tape or the like. A protrusion hangs integrally from the end of the holder plate 150. When the holder plate 150 is fully held in the guide slots, the protrusion 150a is fixed to the end plate 148 by a screw 152. In this movable guide assembly 110', the holder plate 150 can be easily drawn from the guide slots by removing the screws 152, so that the ink absorbing strip 128 can be quickly and easily replaced. In FIG. 15, the reference numerals 144b and 146b denote recessed portions formed on the outer side edges of the guide plates 144 and 146. The recessed portions 144b and 146b serve to partly receive the document conveyer rollers 56, 58. The reference numeral 144c denote protrusions protruding from both ends of the guide plate 144. The protrusions 144c come into contact with the stoppers 76b (FIGS. 4 and 5) to define the closed position of the movable guide assembly 110'.

In the embodiment shown in FIGS. 3 to 12, the cleaner 130 extends over the recording range of the printing head 72 to clean the document conveyer roller (drive roller) 58. In the embodiment shown in FIGS. 16 and 17, however, it is sufficient to use a cleaner 130' which is capable of cleaning only a front region of the printing head 72. In particular, the cleaner 130' is supported by a mounting arm 132' which is attached to the outer surface of the upright wall 92 of the movable guide plate 90 penetrating through an elongated slot 154 formed in the inclined plate 78b of the support frame 74. As will be apparent from FIG. 17, the elongated slot 154 extends over the recording range of the printing head 72. When the printing head 72 moves over the recording range, therefore, the cleaner 132' moves together with the printing head 72. Needless to say, the document conveyer roller 58 is contaminated at only a portion of its surface in front of the printing head 72. Therefore, it is possible to sufficiently clean the document conveyer roller 58 by the cleaner 130' of this constitution.

Figure 18:
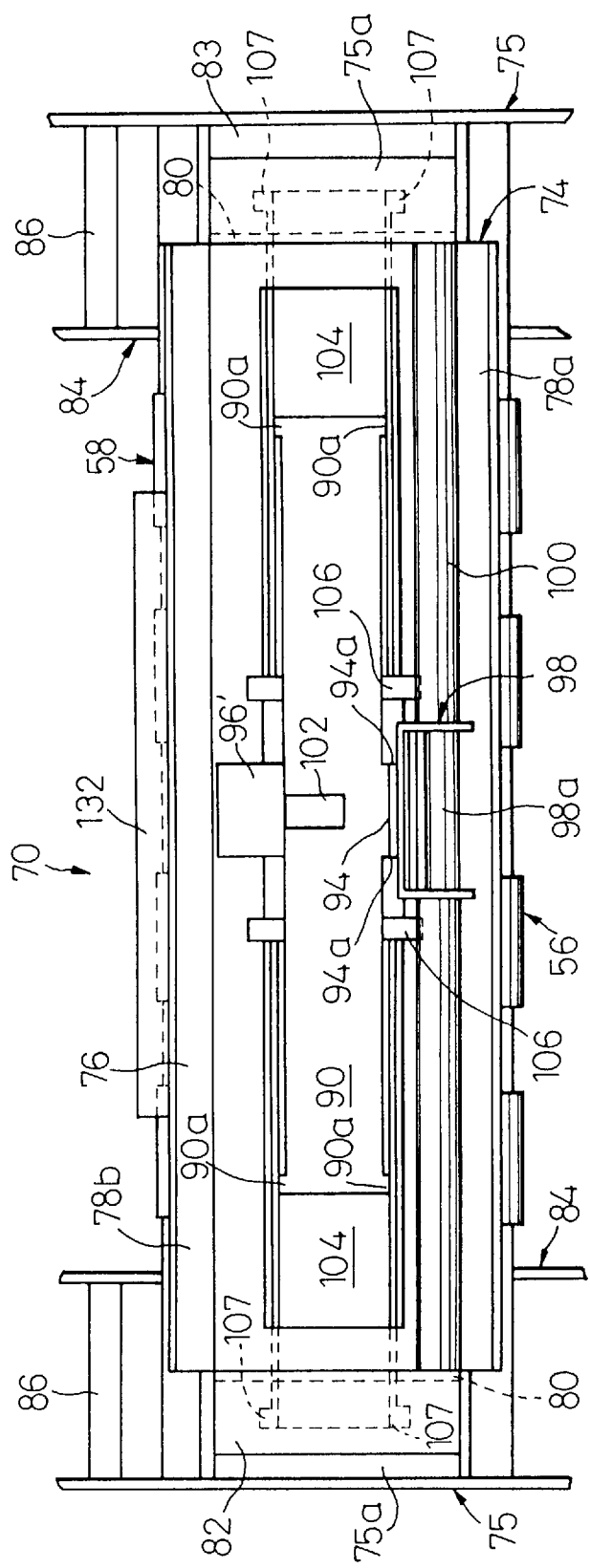
FIG. 18 is a plan view, similar to FIG. 3, of the document reading confirmation mechanism according to another embodiment of the present invention.
Figure 19:
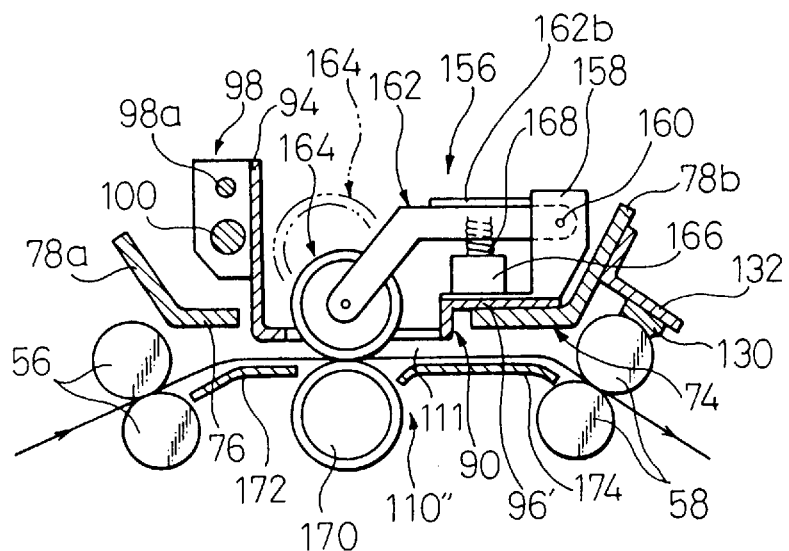
FIG. 19 is a transverse cross-sectional view of the document reading confirmation mechanism of FIG. 18, illustrating the marking means mounted to the movable guide plate.
Figure 20:
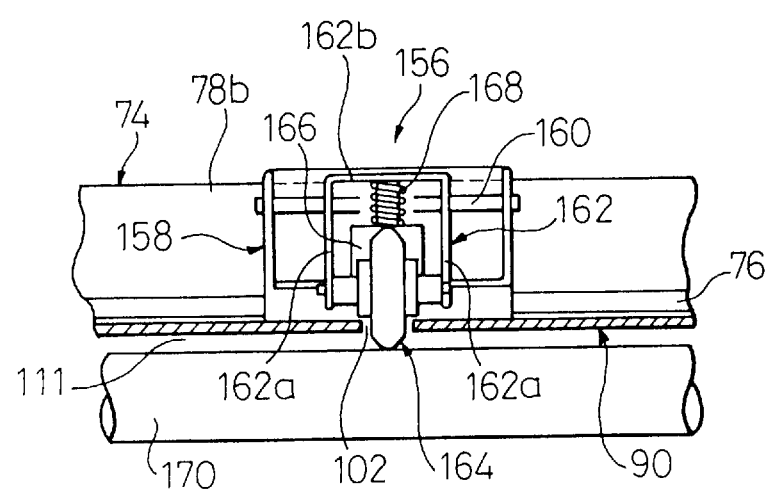
FIG. 20 is a longitudinal cross-sectional view of the document reading confirmation mechanism of FIG. 18, illustrating the marking means mounted to the movable guide plate.

In the embodiment of FIGS. 18 to 21, a marking means is employed instead of the ink jet type printing head 72, the marking means being mounted to a mounting plate 96' shown in FIG. 18. The mounting plate 96' corresponds to the protruded piece 96 although the mounting plate 96' of FIG. 18 is larger than the protruded piece 96 of FIG. 3. The upright wall 92 of the movable guide plate 90 of FIG. 3 is omitted from FIG. 18. In FIGS. 19 and 20, the marking means is generally designated at 156 and comprises a support frame 158 secured to the mounting plate 96', a pivot shaft 160 supported by the side walls of the support frame 158, and an arm 162 pivotably supported by the pivot shaft 160.

Figure 21:
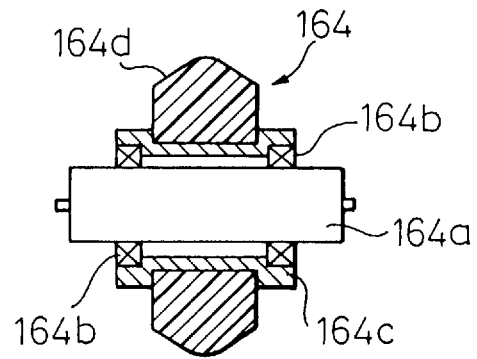
FIG. 21 is a longitudinal cross-sectional view of the marking roller in the marking means.

As shown in FIG. 20, the arm 162 has a pair of arm pieces 162a that are parallel to each other at a constant distance, and the pivot shaft 160 is passed through the arm pieces 162a. As shown in FIG. 19, each arm piece 162a has a first portion that extends from the pivot shaft 160 toward the upright wall 94 of the movable guide plate 90 and a second portion that is inclined from the first portion toward the slot 102. The first portions of the arm pieces 162a are integrally coupled together by a coupling plate 162b, and a marking roller 164 is rotatably held by the arm pieces 162a at the ends of the second portions thereof. As shown in FIG. 21, the marking roller 164 comprises a shaft portion 164a, a rim 164c mounted to the shaft portion 164a via a bearing 164b, and an annular roller 164d fitted onto the rim 164c. The annular roller 164d is made of a porous rubber or a felt, and is impregnated with a liquid coloring material such as an ink.

Referring to FIGS. 19 and 20, an electromagnetic solenoid 166 is mounted to the bottom of the support frame 158, and an end of an operation rod of the electromagnetic solenoid 166 is fastened to the coupling plate 162b. A compression spring 168 is fitted to the operation rod of the electromagnetic solenoid 166, and the resilient force of the compression coil spring 168 works to push up the arm 162 at all times. Usually, the electromagnetic solenoid 166 is placed in an electrically deenergized state where the arm 192 is pushed up by the resilient force of the compression coil spring 168 and the operation rod of the electromagnetic solenoid 166 is drawn out, so that the marking roller 164 is placed at a retracted position indicated by the two-dot chain line (FIG. 19). When the document reading confirmation mark is to be recorded, the electromagnetic solenoid 166 is electrically energized and, at this moment, the operation rod of the electromagnetic solenoid 166 is pulled against the elastic force of the compression coil spring 168 and the arm 162 is located at a position shown in FIGS. 19 and 20, so that the marking roller 164 is placed at a recording position partly protruded beyond the slot 102. In effect, when the electromagnetic solenoid 166 is electrically deenergized, the marking roller 164 is maintained at a retracted position indicated by the two-dot chain line in FIG. 19. When the electromagnetic solenoid 166 is electrically energized, the marking roller 164 is moved from the retracted position to a recording position indicated by the solid line in FIG. 19.

In the embodiment of FIGS. 18 to 21, similar to the embodiment of FIGS. 3 to 12, the movable guide plate 90 and the auxiliary guide 104 cooperate together to provide a guide surface for the document, while the document is conveyed between the document conveyer rollers 56 and the document conveyer rollers 58. However, in this embodiment, the guide surface opposed to the guide surface of the movable guide plate 90 and the auxiliary guide 104 is provided by the movable guide assembly 110". In FIGS. 19 and 20, the movable guide assembly 110" is arranged under the rectangular plate 76 of the support frame 74, similar to the embodiment of FIGS. 3 to 12, and has the approximately same size and shape as those of the rectangular plate 76. Accordingly, a guide passage 111 is formed by the opposing guide surfaces between the document conveyer roller 56 and the document conveyer roller 58. Similar to the above mentioned movable guide assembly 110, the movable guide assembly 110" turns between the closed position (FIGS. 19 and 20) and the open position.

The movable guide assembly 110" includes a platen 170 and guide plates 172 and 174 arranged on both sides thereof, and the platen 170 is rotatably supported by walls (not shown) hanging from both ends of the guide plates 172 and 174. In the embodiment shown in FIGS. 19 to 21, the aforementioned positioning and locking mechanism 118 is incorporated in the bracket 98 secured to the outer surface of the upright wall 94 of the movable guide plate 90, and the marking means 156 is placed and secured at any position in the transverse direction relative to the guide passage 111.

When the electromagnetic solenoid 116 is electrically energized at a predetermined timing while the document passes through the guide passage 111, the marking roller 164 moves from the retracted position to the recording position and, at this moment, the marking roller 164 is brought into contact with the document on the platen 170 in the slot 102. A document reading confirmation mark is recorded onto the document that passes through the passage between the marking roller 164 and the platen 170, using a liquid coloring material with which the annular roller 164d of the marking roller 164 is impregnated. The document reading confirmation mark recorded by the marking means 156 is much simpler than the document reading confirmation mark recorded by the ink jet type printing head 72. From the standpoint of cost, therefore, the marking means 156 is very advantageous compared to the ink jet type printing head 72.

In the embodiment of FIGS. 18 to 21, the drive roller of the document conveyer roller 58 may be contaminated with the document reading confirmation mark printed on the document while the document having the document reading confirmation mark printed thereon passes through the document conveyer rollers 58. Therefore, in this embodiment, similar to the embodiment of FIGS. 3 to 12, the cleaner 130 made of a felt or a blotting paper is adapted to the document conveyer (drive) roller 58, the cleaner 130 being held by the mounting plate 132 extending in a cantilevered fashion from the inclined plate 78b of support frame 74.

Figure 13:
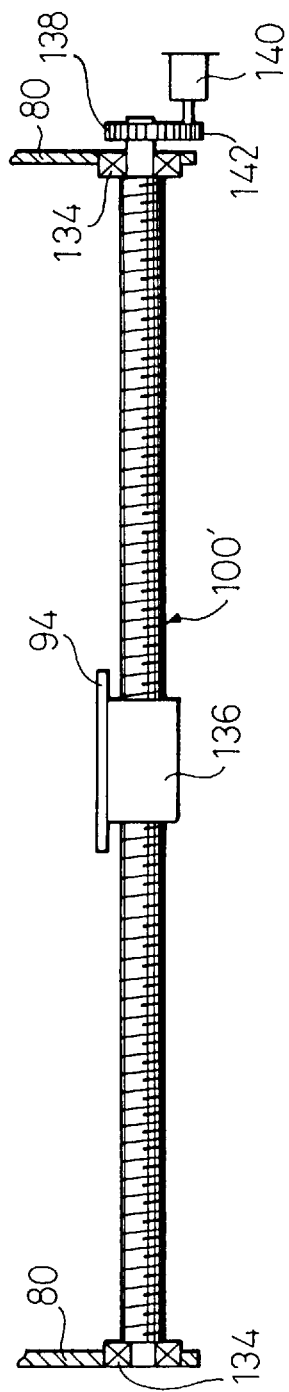
FIG. 13 is a plan view of the automatic operating means for positioning and securing the printing head thereat.
Figure 16:
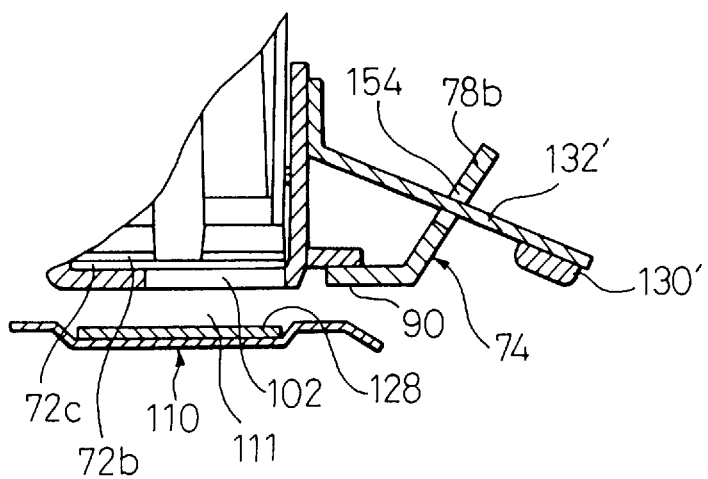
FIG. 16 is a partial sectional view, similar to FIG. 12, of the modified document reading confirmation mechanism of the present invention.
Figure 17:
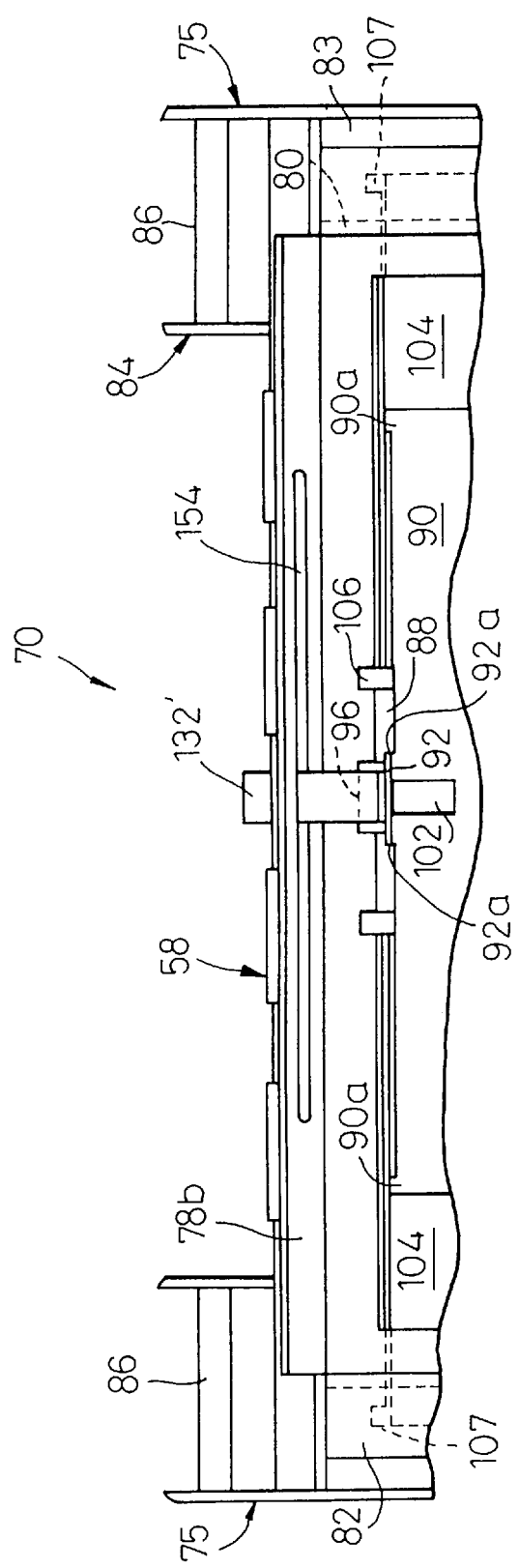
FIG. 17 is a partial plan view of the document reading confirmation mechanism of FIG. 16.

In the embodiment of FIGS. 18 to 21, the marking means 156 is preferably automatically positioned using the guide screw 100' and the nut 136, as shown in FIG. 13. Further, the document conveyer roller 58 may be cleaned by the cleaner which moves together with the movable guide plate 90, as shown in FIGS. 16 and 17. Further, the platen 170 is incorporated in the movable guide assembly 110" in the embodiment of FIGS. 18 to 21. However, the platen 170 may be omitted and a single guide plate only may be provided. In this case, the marking roller 164 is brought into contact with the single guide plate at the recording position.

Figure 22:
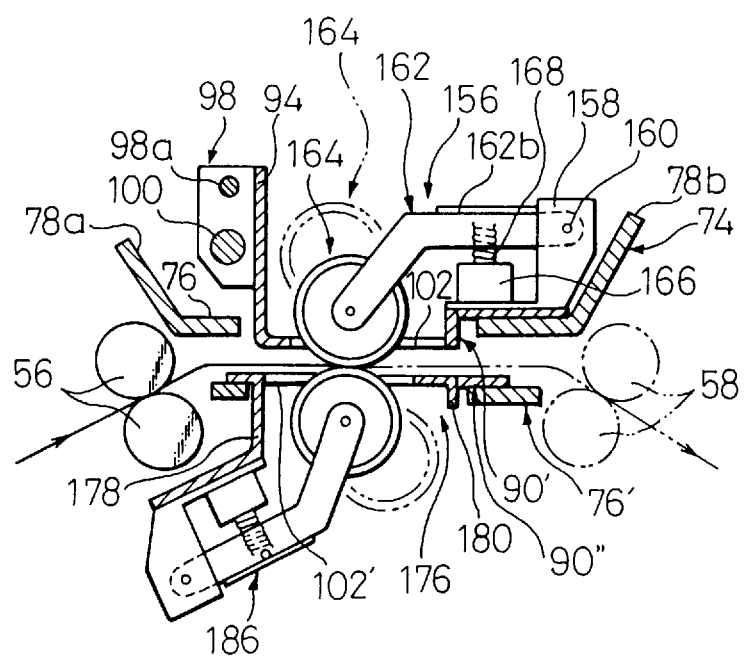
FIG. 22 is a transverse cross-sectional view, similar to FIG. 19, of the document reading confirmation mechanism which can mark the reading confirmation marks on both surfaces of the document.
Figure 23:
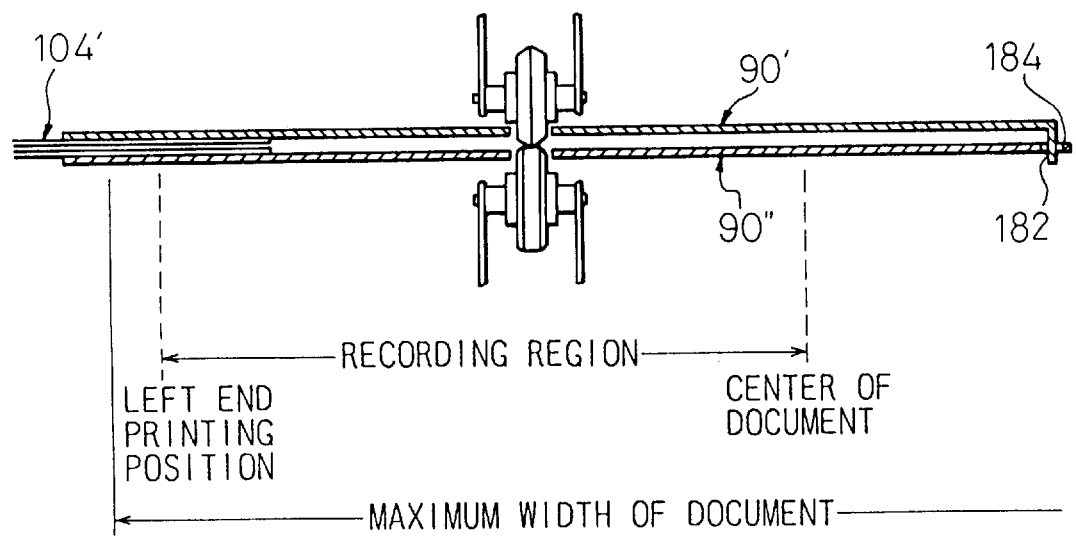
FIG. 23 is a longitudinal cross-sectional view of the document reading confirmation mechanism of FIG. 22, illustrating a relationship between the maximum width of the document and a recording region.
Figure 24:
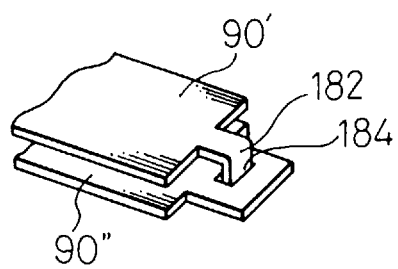
FIG. 24 is a partial perspective of a right end portion of the movable guide plate of FIG. 22.

In the embodiment of FIGS. 22 to 24, the document reading confirmation mark is recorded on the document at both surfaces thereof. The document reading confirmation mechanism 70 in this embodiment is partly the same as that of the embodiment of FIGS. 18 to 21, and the same elements are denoted by the identical reference numerals. This embodiment does not use the auxiliary guides 104 of FIG. 18, but uses an auxiliary guide 104' which slidably contacts one half portion of the movable guide plate 90' (left half portion in FIG. 23). The auxiliary guide 104' comprises a pair of parallel guide plates which are firmly supported by the support frame 74. The marking means 156 is mounted to the movable guide plate 90' in the same manner as in the case of the embodiment of FIGS. 18 to 21.

The movable guide assembly 176 has a rectangular plate 76' having the same shape as that of the rectangular plate 76 of the support frame 74, and the movable guide plate 90" is slidably arranged in the rectangular opening of the rectangular plate 76'. That is, a plurality of pieces 178 and 180 protrude from both side edges of the movable guide plate 90", and are brought into slidable engagement with the side edges of the rectangular opening of the rectangular plate 76', so that the movable guide plate 90" is allowed to slide along the rectangular opening. As will be apparent from FIGS. 23 and 24, a tongue piece 182 which is bent at right angles is formed at the end of the movable guide plate 90' opposite from the auxiliary guide 104' (right end in FIG. 23), and is removably inserted in a hole 184 formed in the corresponding end of the movable guide plate 90", so that the movable guide plate 90" can move with the movable guide plate 90'. When the movable guide assembly 176 is brought to the closed position, the tongue piece 182 of the movable guide plate 90' is inserted in the hole 184 of the movable guide plate 90". When the movable guide assembly 176 is brought to the open position, the tongue piece 182 escapes from the hole 184. When the movable guide assembly 176 is brought into the closed position again, the auxiliary guide 104' is sandwiched by the movable guide plates 90' and 90" as is shown in FIG. 23.

A marking means 186 is mounted on the movable guide plate 90", the marking means 186 being similar to the marking means 156. In the case where the tongue piece 182 of the movable guide plate 90' is inserted in the hole 184 of the movable guide plate 90", two marking means 156 and 186 are aligned with each other as shown in FIGS. 22 and 23, and two marking rollers contact each other at their recording positions. The reference numeral 102' denotes a slot formed in the movable guide plate 90" and corresponds to the slot 102 formed in the movable guide 90'. To record the document reading confirmation marks, the electromagnetic solenoids of the marking means 156 and 186 are electrically energized at the same timing, whereby two marking rollers are brought into contact with each other with the document sandwiched therebetween and, the document reading confirmation marks are thus recorded onto both surfaces of the document.

In the embodiment of FIGS. 22 to 24, moving ranges of the marking means 156 and 186 are limited to only the left side region with respect to the center of the document of the maximum width (in FIG. 23). This is because, when the marking means 156 and 186 are placed at the center of the document, the right ends of the movable guide plates 90' and 90" (FIG. 23) are close to the inner wall on the right side of the housing of the document reading apparatus. In the embodiment of FIGS. 22 to 24, however, it is allowed to record the document reading confirmation marks at any position on both surfaces on the left side regions relative to the central position of the document without undesirably enlarging the housing of the document reading apparatus. In FIGS. 22 and 24, the document reading confirmation marks are recorded on the left side regions relative to the central position of the document for the purpose of easy explanation. It is, however, allowable to record the document reading confirmation marks on the right side regions, as a matter of course.

As explained in greater detail, according to the present invention, the place where the document reading confirmation mark is recorded onto the document can be changed without excessively extending the housing of the document reading apparatus, to meet a variety of requests by the users. Further, the document reading confirmation mechanism provides a guide surface to the entire surface of the document at all times, suppressing the probability of document jamming in the document reading confirmation mechanism. Even when jamming of documents occurs in the document reading confirmation mechanism, the jam can be quickly and easily dealt with, making it possible to read the document maintaining reliability in the operation. Since contamination due to the document reading confirmation mark recorded on the document can be prevented from spreading, the document is not contaminated even when the document data are read by the document reading apparatus. When the document reading confirmation marks are recorded on both surfaces of the document, it is possible to easily confirm whether the data is recorded on both surface of the document or not. When the document reading confirmation mechanism is to be optionally incorporated in the document reading apparatus as required, the document reading apparatus can be provided at a reduced cost.

I claim:

1. A document reading confirmation mechanism arranged in a document reading apparatus for recording a document reading confirmation mark on a document to allow confirmation of whether the document has been read by the document reading apparatus or not, said mechanism comprising:

a guide means providing a guide surface for a document conveyed in a predetermined conveying direction, said guide means including a movable guide plate, said movable guide plate being movable in the transverse direction with respect to the conveying direction within a predetermined range; and recording means mounted onto the movable guide plate of said guide means for recording a document reading confirmation mark on the document while the document is conveyed along the guide surface of said guide means.

2. A document reading confirmation mechanism according to claim 1, wherein said guide means includes at least one auxiliary guide arranged on at least one portion of the movable guide plate for slidable engagement with the movable guide plate, the movement of said at least one auxiliary guide being regulated so that said at least one auxiliary guide cooperates with said movable guide plate to provide a guide surface for the entire surface of the document at all times when said movable guide plate is placed at any position within the predetermined range.

3. A document reading confirmation mechanism according to claim 1, wherein said guide means includes a support frame for movably holding said movable guide plate, said support frame includes a guide rod for guiding said movable guide plate, and a manually operable locking means is provided between said movable guide plate and said guide rod for releasably locking said movable guide plate to said guide rod.

4. A document reading confirmation mechanism according to claim 1, wherein said guide means includes a support frame for movably supporting said movable guide plate, said support frame includes a guide screw for rotatably guiding said movable guide plate, and said movable guide plate has a nut for engagement with said guide screw.

5. A document reading confirmation mechanism arranged in a document reading apparatus for recording a document reading confirmation mark on a document to allow confirmation of whether the document has been read by the document reading apparatus or not, said mechanism comprising:

a first guide means providing a guide surface for a document conveyed in a predetermined conveying direction, said first guide means including a movable guide plate being movable in the transverse direction with respect to the conveying direction within a predetermined range;

a second guide means providing a guide surface in an opposite relationship with the guide surface of the first guide means to cooperate with the guide surface of the first guide means for forming a guide passage between the guide surface; and recording means mounted onto the movable guide plate of said first guide means for recording a document reading confirmation mark on the document while the document is conveyed along the guide passage.

6. A document reading confirmation mechanism according to claim 5, wherein said second guide means is movable between a closed position at which said guide passage is formed and an open position at which said guide passage is opened.

7. A document reading confirmation mechanism according to claim 5, wherein said recording means comprises an ink jet type printing head, and said second guide means includes an ink absorbing material for receiving and absorbing ink droplets ejected from said printing head.

8. A document reading confirmation mechanism according to claim 7, wherein said second guide means includes a holding plate for holding said ink absorbing material, and the holding plate is detachably held in the second guide means.

9. A document reading confirmation mechanism according to claim 5, wherein said recording means comprises a marking element with an ink impregnated therein and a drive means for driving the marking element between a recording position and a retracted position, and said marking element is brought into contact with the guide surface of said second guide means at the recording position.

10. A document reading confirmation mechanism according to claim 9, wherein said second guide means has a platen, and said marking element is brought into contact with said platen at the recording position.

11. A document reading confirmation mechanism according to claim 5, wherein said first guide means includes at least one auxiliary guide arranged on at least one portion of the movable guide plate of said first guide means for slidable engagement with the movable guide plate, the movement of said at least one auxiliary guide being regulated so that said at least one auxiliary guide cooperates with said movable guide plate to provide a guide surface for the entire surface of the document at all times when said movable guide plate is placed at any position within the predetermined range.

12. A document reading confirmation mechanism according to claim 5, wherein said first guide means includes a support frame for movably holding said movable guide plate, said support frame includes a guide rod for guiding said movable guide plate, and a manually operable locking means is provided between said movable guide plate and said guide rod for releasably locking said movable guide plate to said guide rod.

13. A document reading confirmation mechanism according to claim 5, wherein said first guide means includes a support frame for movably supporting said movable guide plate, said support frame includes a guide screw for rotatably guiding said movable guide plate, and said movable guide plate has a nut for engagement with said guide screw.

14. A document reading confirmation mechanism arranged in a document reading apparatus for recording a document reading confirmation mark on a document to allow confirmation of whether the document has been read by the document reading apparatus or not, said mechanism comprising:

a first guide means providing a guide surface for a document conveyed in a predetermined conveying direction, said first guide means including a movable guide plate being movable in the traverse direction with respect to the conveying direction within a predetermined range;

a second guide means providing a guide surface in an opposite relationship with the guide surface of the first guide means to cooperate with the guide surface of the first guide means for forming a guide passage between the guide surfaces, said second guide means including a movable guide plate being movable in the traverse direction with respect to the conveying direction within a predetermined range;

a first recording means mounted onto the movable guide plate of said first guide means for recording a document reading confirmation mark on one surface of the document while the document is conveyed along the guide passage;

a second recording means mounted onto the movable guide plate of said second guide means for recording a document reading confirmation mark on the other surface of the document while the document is conveyed along the guide passage.

15. A document reading confirmation mechanism according to claim 14, wherein the movable guide plates of said first and second guide means are detachably coupled together at one end of each plate for a conjoined movement with each other, and the other ends of said movable guide plates are slidably engaged with the auxiliary guides which are arranged at a fixed position.

16. A document reading confirmation mechanism according to claim 14, wherein said first guide means includes a support frame for movably holding said movable guide plate, said support frame includes a guide rod for guiding said movable guide plate, and a manually operable locking means is provided between said movable guide plate and said guide rod for releasably locking said movable guide plate to said guide rod.

17. A document reading confirmation mechanism according to claim 14, wherein said first guide means includes a support frame for movably supporting said movable guide plate, said support frame includes a guide screw for rotatably guiding said movable guide plate, and said movable guide plate has a nut for engagement with said guide screw.

18. A document reading apparatus comprising:

a document feeding portion, a document reading portion and a document discharging portion along a document conveying passage;

a document conveyor roller arranged between said document reading portion and said document discharging portion to form a part of said document conveying passage;

a document reading confirmation mechanism arranged on the upstream side of said document conveyor roller in a predetermined document conveying direction in said document conveyer passage and close to said document conveyer roller; and wherein said document reading confirmation mechanism comprises:

a guide means providing a guide surface for a document conveyed in said conveying direction, said guide means including a movable guide plate, said movable guide plate being movable in the transverse direction with respect to the conveying direction within a predetermined range;

a recording means mounted onto the movable guide plate of said guide means for recording a document reading confirmation mark on the document with a liquid coloring material while the document is conveyed along the guide surface of said guide means; and a cleaner applied to said document conveyer roller for preventing contamination on the document caused by the document reading confirmation mark, the cleaner being supported by said guide means and extending over a range of the movement of said recording means with said movable guide plate.

19. A document reading apparatus comprising:

a document feeding portion, a document reading portion and a document discharging portion arranged along a document conveying passage;

a document conveyer roller arranged between said document reading portion and said document discharging portion to form a part of said document conveying passage;

a document reading confirmation mechanism arranged on the upstream side of said document conveyer roller in a predetermined document conveying direction in said document conveyer passage and close to said document conveyer roller; and wherein said document reading confirmation mechanism comprises:

a guide means providing a guide surface for a document conveyed in said conveying direction, said guide means including a movable guide plate, said movable guide plate being movable in the traverse direction with respect to the conveying direction within a predetermined range;

recording means mounted onto the movable guide plate of said guide means for recording a document reading confirmation mark on the document with a liquid coloring material while the document is conveyed along the guide surface of said guide means; and a cleaner applied to said document conveyer roller for preventing contamination on the document caused by the document reading confirmation mark, the cleaner being supported by said guide means for conjoint movement with the movable guide plate, the cleaner being arranged in alignment with said recording means mounted to said movable guide plate in the document conveying direction.

20. A document reading apparatus comprising:

a main frame;

a subframe pivotably attached to said main frame for pivotal movement between a closed position and an open position with respect to said main frame, said main frame and said subframe having a boundary surface therebetween;

a document conveying passage formed along the boundary surface between said main frame and said subframe;

a document feeding portion, a document reading portion and a document discharging portion arranged along said document conveying passage; and a document reading confirmation mechanism arranged between said document reading portion and said document discharging portion, said document reading confirmation mechanism comprising:

a first guide means providing a guide surface for a document conveyed in said document conveying direction, said first guide means including a movable guide plate being movable in the transverse direction with respect to the conveying direction within a predetermined range;

a second guide means providing a guide surface in an opposite relationship with the guide surface of the first guide means to cooperate with the guide surface of the first guide means for forming a guide passage between the guide surfaces; and recording means mounted onto the movable guide plate of said first guide means for recording a document reading confirmation mark on the document while the document is conveyed along the guide passage, said second guide means being pivotably attached to said first guide means for pivotal movement between a closed position at which said guide passage is formed and an open position at which said guide passage is opened, and the pivotal movement of said subframe between the closed position and the open position with respect to said main frame being associated with the pivotal movement of said second guide means between the closed position and the open position.

21. A document reading apparatus comprising:

a housing including a document feeding portion, a document reading portion and a document discharging portion arranged along a document conveying passage;

a portion of said housing comprising an openable door at an intermediate region between said document reading portion and said document discharging portion so that said portion of said housing can be exposed at least partly; and a document reading confirmation mechanism arranged in said intermediate region for recording a document reading confirmation mark on a document to allow confirmation of whether the document has been read by the document reading apparatus or not, the document reading confirmation mechanism being accessible by opening the openable door, said document reading confirmation mechanism including:

a guide means providing a guide surface for a document conveyed in a predetermined conveying direction, said guide means including a movable guide plate said movable guide plate being movable in the transverse direction with respect to the conveying direction within a predetermined range; and recording means mounted onto the movable guide plate of said guide means for recording a document reading confirmation mark on the document while the document is conveyed along the guide surface of said guide means.

\* \* \* \* \*